United States Patent
Lai et al.

(10) Patent No.: US 11,698,529 B2
(45) Date of Patent: Jul. 11, 2023

(54) SYSTEMS AND METHODS FOR DISTRIBUTING A NEURAL NETWORK ACROSS MULTIPLE COMPUTING DEVICES

(71) Applicant: Meta Platforms Technologies, LLC, Menlo Park, CA (US)

(72) Inventors: Liangzhen Lai, Fremont, CA (US); Pierce I-Jen Chuang, Sunnyvale, CA (US); Vikas Chandra, Fremont, CA (US); Ganesh Venkatesh, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 788 days.

(21) Appl. No.: 16/506,479

(22) Filed: Jul. 9, 2019

(65) Prior Publication Data
US 2021/0011288 A1    Jan. 14, 2021

(51) Int. Cl.
*G02B 27/01* (2006.01)
*H04N 13/106* (2018.01)
(Continued)

(52) U.S. Cl.
CPC .......... *G02B 27/017* (2013.01); *G06N 3/04* (2013.01); *G06N 3/045* (2023.01);
(Continued)

(58) Field of Classification Search
CPC .......... G02B 27/017; G02B 2027/0138; G02B 2027/014; G02B 7/06; G02B 7/09;
(Continued)

(56) References Cited

U.S. PATENT DOCUMENTS

2018/0018451 A1*  1/2018  Spizhevoy ............. G06V 40/19
2019/0050718 A1    2/2019  Tickoo et al.
(Continued)

FOREIGN PATENT DOCUMENTS

EP    3 401 786 A2    11/2018

OTHER PUBLICATIONS

Leroux, Sam, et al. "The cascading neural network: building the internet of smart things." Knowledge and Information Systems 52.3 (2017): 791-814. (Year: 2017).*
(Continued)

*Primary Examiner* — Miranda M Huang
*Assistant Examiner* — Sidney Vincent Bostwick
(74) *Attorney, Agent, or Firm* — Foley & Lardner LLP

(57) ABSTRACT

Disclosed herein is a method for using a neural network across multiple devices. The method can include receiving, by a first device configured with a first one or more layers of a neural network, input data for processing via the neural network implemented across the first device and a second device. The method can include outputting, by the first one or more layers of the neural network implemented on the first device, a data set that is reduced in size relative to the input data while identifying one or more features of the input data for processing by a second one or more layers of the neural network. The method can include communicating, by the first device, the data set to the second device for processing via the second one or more layers of the neural network implemented on the second device.

18 Claims, 9 Drawing Sheets

(51) Int. Cl.
  *G06N 3/04* (2023.01)
  *G06N 3/045* (2023.01)
(52) U.S. Cl.
  CPC ..... *H04N 13/106* (2018.05); *G02B 2027/014* (2013.01); *G02B 2027/0138* (2013.01)
(58) Field of Classification Search
  CPC .. G02B 27/0093; G02B 27/0172; G06N 3/04; G06N 3/0454; G06N 3/084; G06N 3/063; H04N 13/106; G06F 3/011; G06F 3/013
  See application file for complete search history.

(56) References Cited

U.S. PATENT DOCUMENTS

2019/0095946 A1* 3/2019 Azout ................. G06N 3/0454
2020/0311616 A1* 10/2020 Rajkumar ............. G06N 5/043

OTHER PUBLICATIONS

Xie, Junyuan, Ross Girshick, and Ali Farhadi. "Deep3d: Fully automatic 2d-to-3d video conversion with deep convolutional neural networks." European conference on computer vision. Springer, Cham, 2016. (Year: 2016).*

Sun, Yongbin, et al. "Magichand: Interact with iot devices in augmented reality environment." 2019 IEEE Conference on Virtual Reality and 3D User Interfaces (VR). IEEE, 2019. (Year: 2019).*

International Preliminary Report Patentability for International Application No. PCT/US2020/041077, dated Jan. 20, 2022, 10 pages.

International Search Report and Written Opinion on PCT/US2020/041077 dated Oct. 9, 2020.

Leroux Sam et al: "The Cascading Neural Network: building the Internet of Smart Thing", Knowledge and Information Systems, Springer Verlag, London GB, vol. 52, No. 3, Feb. 16, 2017, pp. 791-814.

* cited by examiner

SYSTEMS AND METHODS FOR DISTRIBUTING A NEURAL NETWORK ACROSS MULTIPLE COMPUTING DEVICES

FIELD OF DISCLOSURE

The present disclosure is generally related to neural networks, including but not limited to neural networks implemented in a head mounted display system.

BACKGROUND

The present disclosure relates to neural networks. More particularly, the present disclosure relates to implementing neural networks in a head mounted display system. Head mounted displays can be used in augmented reality and/or virtual reality systems and commonly include processing circuitry. However, the processing capabilities of the processing circuitry that is local to the head mounted display may be limited due to size and heat dissipation constraints. Certain computationally heavy processes can be difficult to perform locally on the processing circuitry of the head mounted display. Additionally, off-loading the computationally heavy processes to an external processing unit can cause lag and may require excessive amounts of energy to transmit the data.

SUMMARY

Various embodiments disclosed herein are related to a method. In some embodiments, the method includes receiving, by a first device configured with a first one or more layers of a neural network, input data for processing via the neural network implemented across the first device and a second device. In some embodiments, the method includes outputting, by the first one or more layers of the neural network implemented on the first device, a data set that is reduced in size relative to the input data while identifying one or more features of the input data for processing by a second one or more layers of the neural network. In some embodiments, the method includes communicating, by the first device, the data set to the second device for processing via the second one or more layers of the neural network implemented on the second device.

In some embodiments, the method further includes reducing, by the first one or more layers, the data set by compressing the data set for transmission via a network to the second device.

In some embodiments, the second one or more layers detect a feature of the one or more features within the input data.

In some embodiments, the method further includes receiving, by the first device, an indication from the second device that the feature was detected by the second one or more layers.

In some embodiments, the method further includes detecting, by the first device, that a feature of the one or more features meets a threshold of accuracy to take an action by the first device.

In some embodiments, the method further includes performing, by the first device responsive to the detection, the action with respect to the feature.

In some embodiments, the method further includes performing the action without communicating the data set to the second device.

Various embodiments disclosed herein are related to a method. In some embodiments, the method includes receiving, by a processor of a wearable head display, input data captured by the wearable head display. In some embodiments, the method includes generating, by a first one or more layers of a neural network implemented on the processor, a data set that is reduced in size relative to the input data while identifying one or more features of the input data for processing by a second one or more layers of the neural network. In some embodiments, the method includes detecting, by the processor, a feature of the one or more features in the data set. In some embodiments, the method includes performing, by the processor responsive to detecting the feature, an action with respect to the feature instead of communicating the data set to a second device implementing the second one or more layers of the neural network.

In some embodiments, the method further includes detecting, by the processor, the feature within a threshold of accuracy.

In some embodiments, the method further includes performing the action comprising modifying an image being displayed via the wearable head display.

In some embodiments, the method further includes generating, by the first one or more layers implemented on the processor, a second data set that is reduced in size relative to a second input data while identifying a second one or more features in the second input data.

In some embodiments, the method further includes determining, by the processor, that a second feature of the second one or more features is not detectable within a threshold of accuracy.

In some embodiments, the method further includes communicating, by the processor responsive to the determination, the second data set to the second device implementing the second one or more layers of the neural network.

In some embodiments, the method further includes receiving, by the processor, from the second device an indication of a result of processing of the second data set by the second one or more layers.

Various embodiments disclosed herein are related to a system. In some embodiments, the system includes a first device configured to receive input data for processing via a neural network implemented across the first device and a second device. In some embodiments, a first one or more layers of the neural network implemented on the first device is configured to output a data set that is reduced in size relative to the input data while identifying one or more features of the input data for processing by a second one or more layers of the neural network. In some embodiments, the first device is configured to communicate the data set to the second device for processing via the second one or more layers of the neural network implemented on the second device.

In some embodiments, the first one or more layers is further configured to reduce the data set by compressing the data set for transmission via a network to the second device.

In some embodiments, the second one or more layers is further configured to detect a feature of the one or more features within the input data.

In some embodiments, the first device is further configured to receive an indication from the second device that the feature was detected by the second one or more layers.

In some embodiments, the first device is further configured to detect that a feature of the one or more features meets a threshold of accuracy to take an action by the first device.

In some embodiments, the first device is further configured to perform, responsive to the detection, the action with respect to the feature and without communicating the data set to the second device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Overview

Figure 1A:
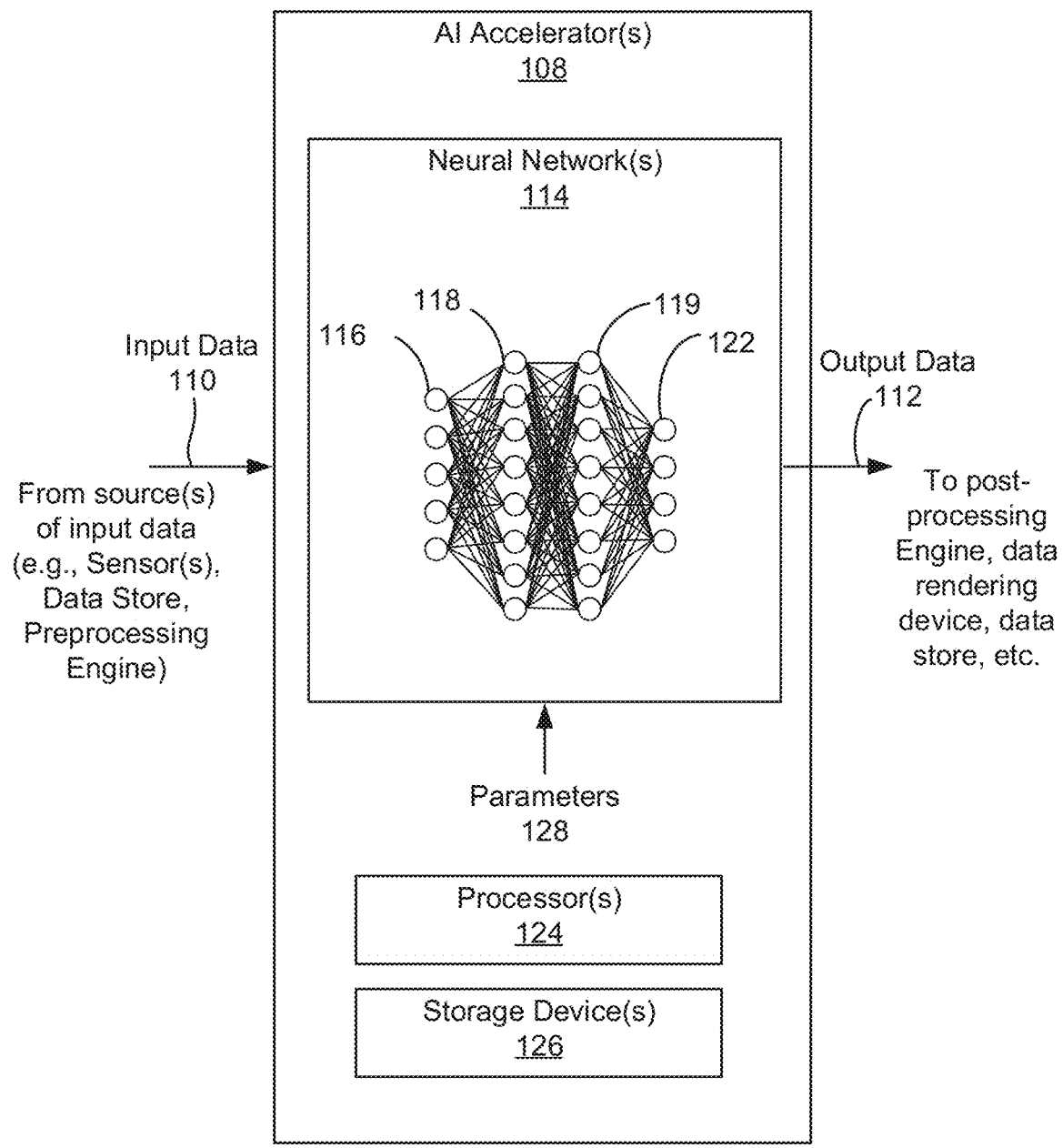
FIG. 1A is a block diagram of an embodiment of a system for performing artificial intelligence (AI) related processing, according to an example implementation of the present disclosure.

Before turning to the FIGURES, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for implementing an embodiment of the present systems, methods and devices in a head mounted display environment; and Section C describes embodiments of devices, systems and methods for implementing an embodiment of the present systems, methods and devices across multiple devices.

Referring generally to the FIGURES, systems and methods for implementing a neural network or for implementing multiple neural networks across multiple devices are shown, according to some embodiments. The systems and methods can be implemented to optimize neural network computations for energy savings by splitting the computations across multiple devices. The system may include a first device and a second device. In some embodiments, the first device includes a first neural network or a first set of one or more layers of a neural network. The first device can be a graphical processing unit (GPU), a central processing unit (CPU), etc., or any other local processing circuitry, controllers, processors, etc. In some embodiments, the first device is a local computer device of a head mounted display (HMD), an augmented reality (AR), or a virtual reality (VR) system. The second device can include a second neural network or a second set of one or more layers of the neural network. In some embodiments, the second device is an external device relative to the first device, a remote device, a wirelessly connected processing unit, an artificial intelligence accelerator, a desktop unit, a network device, etc. The first device is configured to receive input data (e.g., image data) from one or more sensors, external controllers, external computer systems, pre-processing engines, etc., and provide the input data to the first neural network. The first neural network can identify one or more features of the input data as an output to the first neural network. In some embodiments, the first device also determines an error or an accuracy associated with each of the one or more features of the input data or associated with each of the one or more outputs of the first neural network. In some embodiments, the first device uses the error or the accuracy and one or more corresponding threshold values to determine if the second device is required for further analysis of the input data. The first device may use the error or the accuracy or other logic to determine whether or not it can make a sufficiently accurate determination without using the second device and the second portion of the neural network.

The first device can generate a reduced data set based on the input data and provide the reduced data set to the second device as an input to the neural network on the second device. In some embodiments, the reduced data set is generated as an output of the neural network on the first device. In some embodiments, the reduced data set is generated by the neural network on the first device in addition to the outputs of the neural network that identity one or more features of the input data. In some embodiments, the reduced data set is smaller in size (e.g., in storage size) when compared to the input data. For example, if the input data is image data having 1200×1200 pixels, the reduced data set may also be image data but having a size of 500×500 pixels. In some embodiments, the reduced data set is generated in response to the error or the accuracy being greater than or less than the corresponding threshold values. In some embodiments, the reduced data set is generated regardless of the error and/or accuracy of the one or more outputs of the neural network of the first device but is only provided to the second device in response to the accuracy being less than the corresponding threshold value or in response to the error being greater than the corresponding threshold value.

In some embodiments, the first device is configured to perform an action based on the one or more identified features of the input data. In some embodiments, the first device is configured to perform one or more actions based on the one or more features of the input data. In some embodiments, the first device is configured to perform the action while concurrently providing the reduced data set to the neural network of the second device. In some embodiments, the first device is configured to perform the action(s) without providing the reduced data set to the second device and/or without generating the reduced data set. In some embodiments, the action is performed in response to or based on outputs of the neural network of the second device. In some embodiments, the outputs of the neural network of the second device are additional identified features. In some embodiments, if the features of the input data cannot be accurately identified the neural network of the first device, the reduced data set is provided to the second device for identifying one or more features of the input data.

Advantageously, the systems and methods described herein facilitate a more efficient processing system for HMD display systems, AR systems, VR systems, etc. The systems and methods described herein reduce the processing requirements of the first device by only implementing a portion of the neural network on the first device or by implementing a computationally lighter neural network on the first device. If the first device can accurately analyze the input data, the first device can use the results of the neural network to perform actions such as providing imagery to a user on a display, thereby reducing traffic/data transmission between the first and second device and reducing energy consumption. If the first device cannot accurately analyze the input data, the first device can generate and provide the reduced data set to the second device where the reduced data set can be further analyzed. Advantageously, this reduces the frequency of data transmission between the first and second devices, reduces the size of data transferred between the first and the second device, and facilitates A. Environment for Artificial Intelligence Related Processing <Start of Boilerplate for AI Hardware System in General>

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) and/or one or more storage devices 126.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing, forming, building, synthesizing and/or establishing the neural network using architectures that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 128 differently for each neural network 114, or assigning different weights (e.g., hyperparameters, or learning rates), tensor flows, etc. Thus, by setting appropriate parameters 128 for the neural network(s) 114 based on a tuning or training process and the objective of the neural network(s) and/or the sy24stem, this can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represent some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduce the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122 for example. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information from a training phase for example, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108, in parallel for example), sequential processing (e.g., on the same component of an AI accelerator 108, at different times or stages), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics related, internet of things (IoT) related, and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
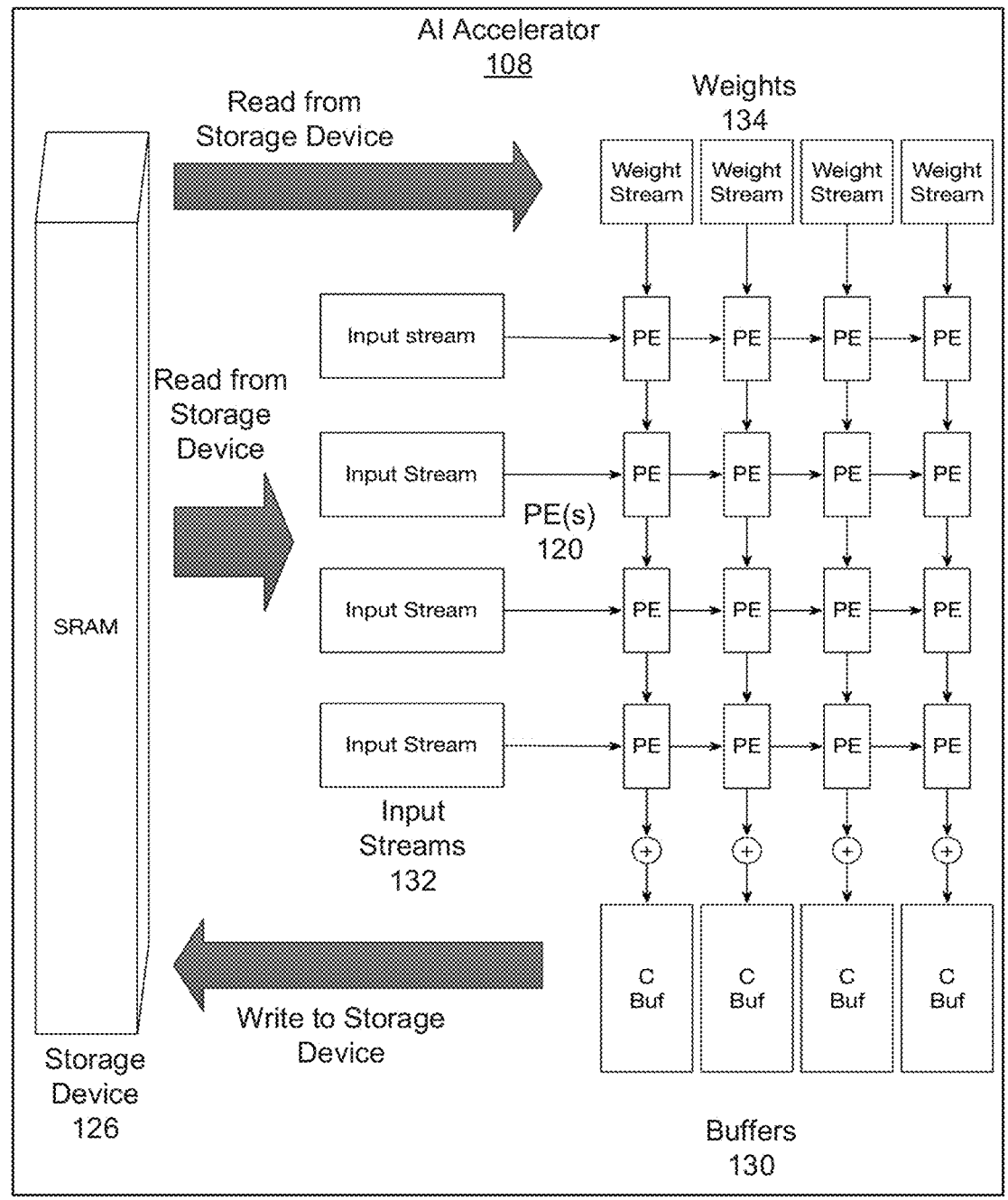
FIG. 1B is a block diagrams of an embodiment of a device for performing artificial intelligence (AI) related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The neuron can be implemented as a corresponding PE circuit, and the processing/activation that can occur at the neuron can be performed at the PE circuit. The PEs are connected into a particular network pattern or array, with different patterns serving different functional purposes. The PE in an artificial neural network operate electrically (e.g., in the embodiment of a semiconductor implementation), and may be either analog, digital, or a hybrid. To parallel the effect of a biological synapse, the connections between PEs can be assigned multiplicative weights, which can be calibrated or "trained" to produce the proper system output.

A PE can be defined in terms of the following equations (e.g., which represent a McCulloch-Pitts model of a neuron):

$$\zeta = \Sigma_i w_i x_i \quad (1)$$

$$y = \sigma(\zeta) \quad (2)$$

Where $\zeta$ is the weighted sum of the inputs (e.g., the inner product of the input vector and the tap-weight vector), and $\sigma(\zeta)$ is a function of the weighted sum. Where the weight and input elements form vectors w and x, the $\zeta$ weighted sum becomes a simple dot product:

$$\zeta = w \cdot x \quad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some network networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

In some embodiments, the PEs can be arranged and/or implemented as a systolic array. A systolic array can be a network (e.g., a homogeneous network) of coupled data processing units (DPUs) such as PEs, called cells or nodes. Each node or PE can independently compute a partial result as a function of the data received from its upstream neighbors, can store the result within itself and can passes the result downstream for instance. The systolic array can be hardwired or software configured for a specific application. The nodes or PEs can be fixed and identical, and interconnect of the systolic array can be programmable. Systolic arrays can rely on synchronous data transfers.

Referring again to FIG. 1B, the input x to a PE 120 can be part of an input stream 132 that is read or accessed from a storage device 126 (e.g., SRAM). An input stream 132 can be directed to one row (horizontal bank or group) of PEs, and can be shared across one or more of the PEs, or partitioned into data portions (overlapping or non-overlapping data portions) as inputs for respective PEs. Weights 134 (or weight information) in a weight stream 134 (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE (e.g., without passing through other PE(s)), or can be routed through one or more PEs (e.g., along a row or column of PEs) to the target PE. The output of each PE can be routed directly out of the PE array (e.g., without passing through other PE(s)), or can be routed through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored to the storage device 126 can be retrieved or read from the storage device 126, and be used as inputs to the array of PEs 120 for processing (of a subsequent layer of the neural network) at a later time. In certain embodiments, the outputs that are stored to the storage device 126 can be retrieved or read from the storage device 126 as output data 112 for the AI accelerator 108.

Figure 1C:
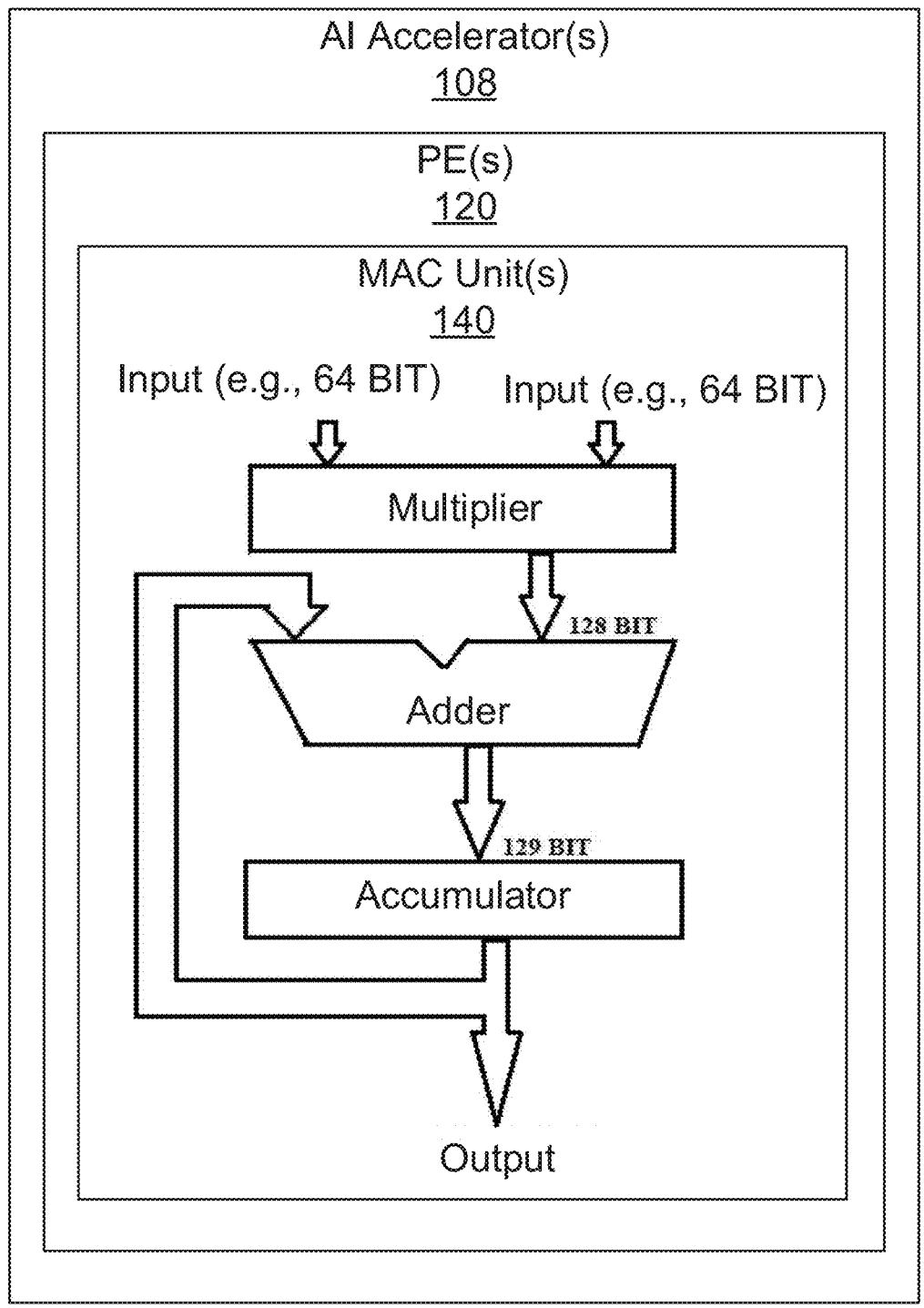
FIG. 1C is a block diagram of an embodiment of a device for performing artificial intelligence (AI) related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to (singly or collectively) as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator operand a, and inputs b and c:

$$a \leftarrow a + (b \times c) \qquad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator. An array or plurality of MAC units 140 (e.g., in PEs) can be arranged in a systolic array, for parallel integration, convolution, correlation, matrix multiplication, data sorting, and/or data analysis tasks.

Figure 1D:
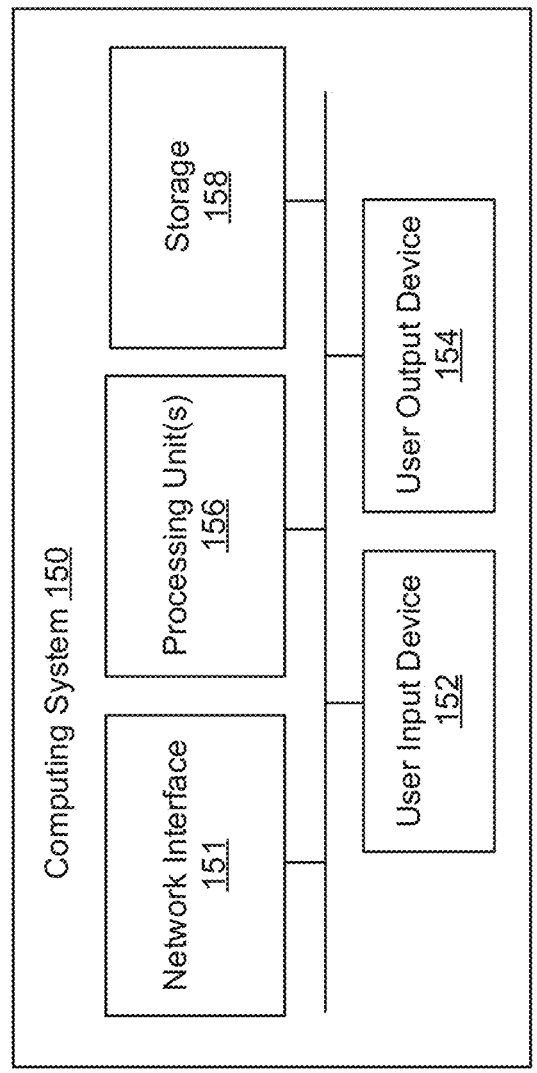
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 154 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Implementations of the present disclosure can be realized in a variety of apparatus including electronic devices implemented using any combination of circuitry and software.
<end of boilerplate for AI hardware>
B. Systems, Methods, and Devices for a Head Mounted Display AR systems can use an HMD (may also be referred to as a head-worn display (HWD)) to present images to a user at appropriate depth. The HMD can determine depth information for objects or features in a scene and render those objects and features at the determined depth (e.g., at least partially in response to the depth information). For example, the HMD can be used to present images that can be viewed stereoscopically, such as by sequentially or simultaneously presenting left eye images and right eye images, enabling a user to perceive a 3D environment. The HMD or the AR system can include one or more cameras that capture images from multiple perspectives, such as left eye and right eye images.

The HMD or AR system can use an eye tracking operation, which can be at least partially operated by a processor, eye tracking sensors, or combinations thereof, to monitor or track positions and orientations of eyes of a user of the HMD. For example, the eye tracking operation can be used to determine a direction that the user is gazing. The eye tracking operation can provide the direction information to components of the HMD or AR system that are used to present the images to the user, such as to determine where the images are to be displayed relative to the eyes of the user.

In some embodiments, the system can determine scene understanding based on locations of objects in a scene or environment around the HMD or AR system, such as by using sensor data from cameras or depth sensors. The system can determine that the user is interacting with one or more objects based on the sensor data, such as by determining that the user is holding or moving the object, gazing at the object, or reading text associated with the object. The system can determine that the user is interacting with the object based on the object being the only object in a threshold range of the gaze direction of the user. The system can determine that the user is interacting with the object based on audio cues, such as by detecting that the object is outputting sound. The system can calibrate a varifocal system using the gaze direction information as a vergence cue, such as by using the gaze direction or the position of the object to estimate a vergence plane so that the varifocal system can adjust focus to match the vergence plane. The system can operate machine learning models for eye tracking. The system can use the eye tracking calibration to identify pupil locations for correcting rendering and projector output by the HMD, such as to enable dynamic uniformity correction of one or more waveguides of the HMD. The system can perform foveated rendering using the calibration of the eye tracking.

Figure 2A:
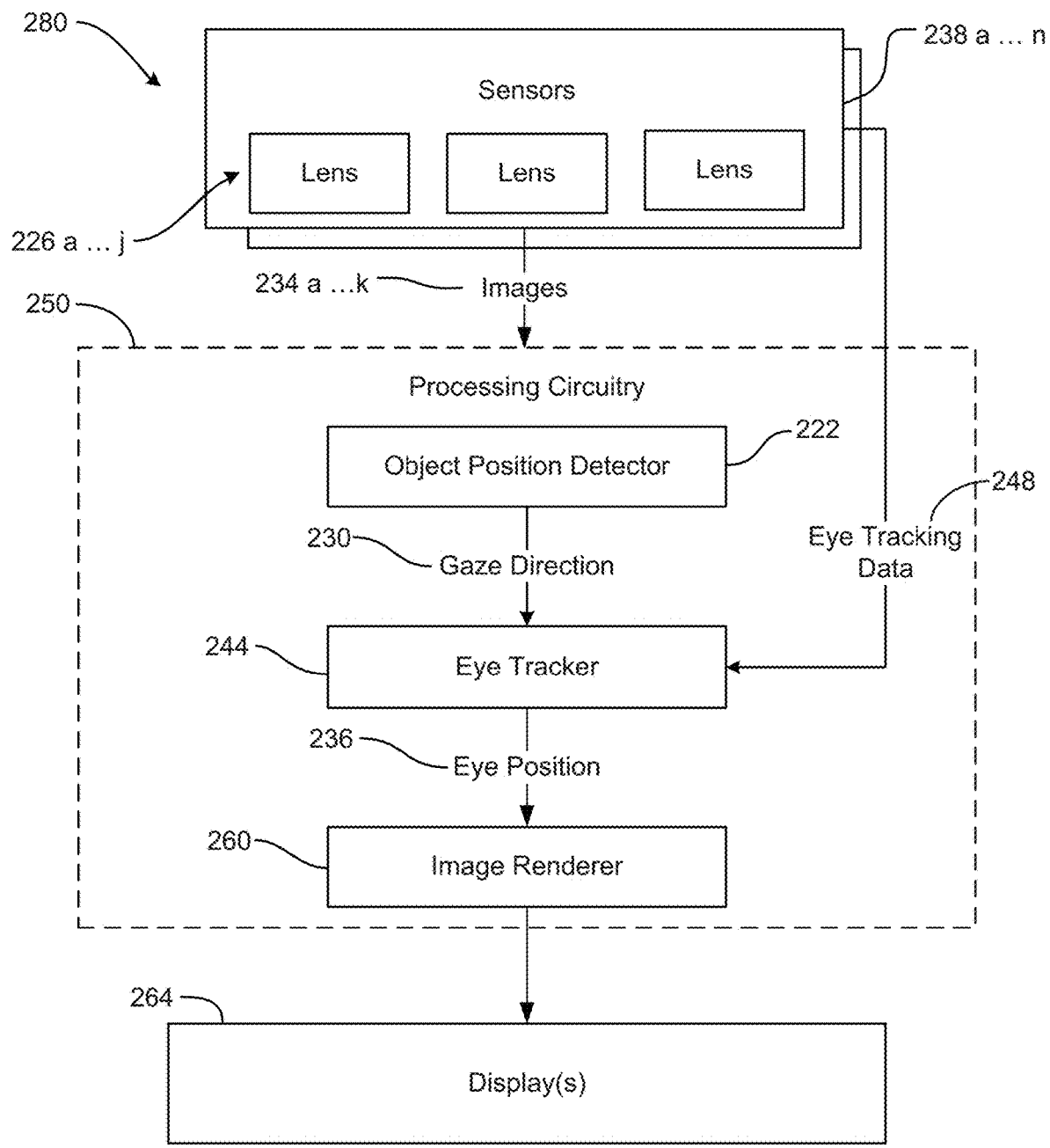
FIG. 2A is a block diagram of a display system, according to some embodiments.

Referring now to FIG. 2A, a system 280 can include a plurality of sensors 238a . . . n, processing circuitry 250, and one or more displays 264. The system 280 can be implemented using the HMD system 200 described with reference to FIG. 2B. The system 280 can be implemented using the computing environment described with reference to FIG. 4. The system 280 can incorporate features of and be used to implement features of VR systems. At least some of the processing circuitry 250 can be implemented using a GPU. The functions of the processing circuitry 250 can be executed in a distributed manner using a plurality of processing units.

The processing circuitry 250 may include one or more circuits, processors, and/or hardware components. The processing circuitry 250 may implement any logic, functions or instructions to perform any of the operations described herein. The processing circuitry 250 can include any type and form of executable instructions executable by any of the circuits, processors or hardware components. The executable instructions may be of any type including applications, programs, services, tasks, scripts, libraries processes and/or firmware. Any of the object position detector 222, eye tracker 244, or image renderer 260 may be any combination or arrangement of circuitry and executable instructions to perform their respective functions and operations. At least some portions of the processing circuitry 250 can be used to implement image processing executed by the sensors 238.

The sensors 238a . . . n can be image capture devices or cameras, including video cameras. The sensors 238a . . . n may be cameras that generate images of relatively low quality (e.g., relatively low sharpness, resolution, or dynamic range), which can help reduce the SWAP of the system 280. For example, the sensors 238a . . . n can generate images having resolutions on the order of hundreds of pixels by hundreds of pixels. At the same time, the processes executed by the system 280 as described herein can be used to generate display images for presentation to a user that have desired quality characteristics, including depth characteristics.

The sensors 238a . . . n (generally referred herein as sensors 238) can include any type of one or more cameras. The cameras can be visible light cameras (e.g., color or black and white), infrared cameras, or combinations thereof. The sensors 238a . . . n can each include one or more lenses 226 a . . . j generally referred herein as lens 226). In some embodiments, the sensor 238 can include a camera for each lens 226. In some embodiments, the sensor 238 include a single camera with multiple lenses 226 a . . . j. In some embodiments, the sensor 238 can include multiple cameras, each with multiple lenses 226. The one or more cameras of the sensor 238 can be selected or designed to be a predetermined resolution and/or have a predetermined field of view. In some embodiments, the one or more cameras are selected and/or designed to have a resolution and field of view for detecting and tracking objects, such as in the field of view of a HMD for augmented reality. The one or more cameras may be used for multiple purposes, such as tracking objects in a scene or an environment captured by the image capture devices and performing the calibration techniques described herein.

The one or more cameras of the sensor 238 and lens 226 may be mounted, integrated, incorporated or arranged on an HMD to correspond to a left-eye view of a user or wearer of the HMD and a right-eye view of the user or wearer. For example, an HMD may include a first camera with a first lens mounted forward-facing on the left side of the HMD corresponding to or near the left eye of the wearer and a second camera with a second lens mounted forward-facing on the right-side of the HMD corresponding to or near the right eye of the wearer. The left camera and right camera may form a front-facing pair of cameras providing for stereographic image capturing. In some embodiments, the HMD may have one or more additional cameras, such as a third camera between the first and second cameras an offers towards the top of the HMD and forming a triangular shape between the first, second and third cameras. This third camera may be used for triangulation techniques in performing the depth buffer generations techniques of the present solution, as well as for object tracking.

The system 280 can include a first sensor (e.g., image capture device) 238a that includes a first lens 226a, the first sensor 238a arranged to capture a first image 234a of a first view, and a second sensor 238b that includes a second lens 226b, the second sensor 238b arranged to capture a second image 234b of a second view. The first view and the second view may correspond to different perspectives, enabling depth information to be extracted from the first image 234a and second image 234b. For example, the first view may correspond to a left eye view, and the second view may correspond to a right eye view. The system 280 can include a third sensor 238c that includes a third lens 226c, the third sensor 238c arranged to capture a third image 234c of a third view. As described with reference to FIG. 2B, the third view may correspond to a top view that is spaced from an axis between the first lens 226a and the second lens 226b, which can enable the system 280 to more effectively handle depth information that may be difficult to address with the first sensor 238a and second sensor 238b, such as edges (e.g., an edge of a table) that are substantially parallel to the axis between the first lens 226a and the second lens 226b.

Light of an image to be captured by the sensors 238a . . . n can be received through the one or more lenses 226 a . . . j. The sensors 238a . . . n can include sensor circuitry, including but not limited to charge-coupled device (CCD) or complementary metal-oxide-semiconductor (CMOS) circuitry, which can detect the light received via the one or more lenses 226a . . . j and generate images 234a . . . k based on the received light. For example, the sensors 238a . . . n can use the sensor circuitry to generate the first image 234a corresponding to the first view and the second image 234b corresponding to the second view. The one or more sensors 238a . . . n can provide the images 234a . . . k to the processing circuitry 250. The one or more sensors 238a . . . n can provide the images 234a . . . k with a corresponding timestamp, which can facilitate synchronization of the images 234a . . . k when image processing is executed on the images 234a . . . k, such as to identify particular first the second images 234a, 234b representing first and second views and having the same timestamp that should be compared to one another to calculate gaze information.

Figure 2B:
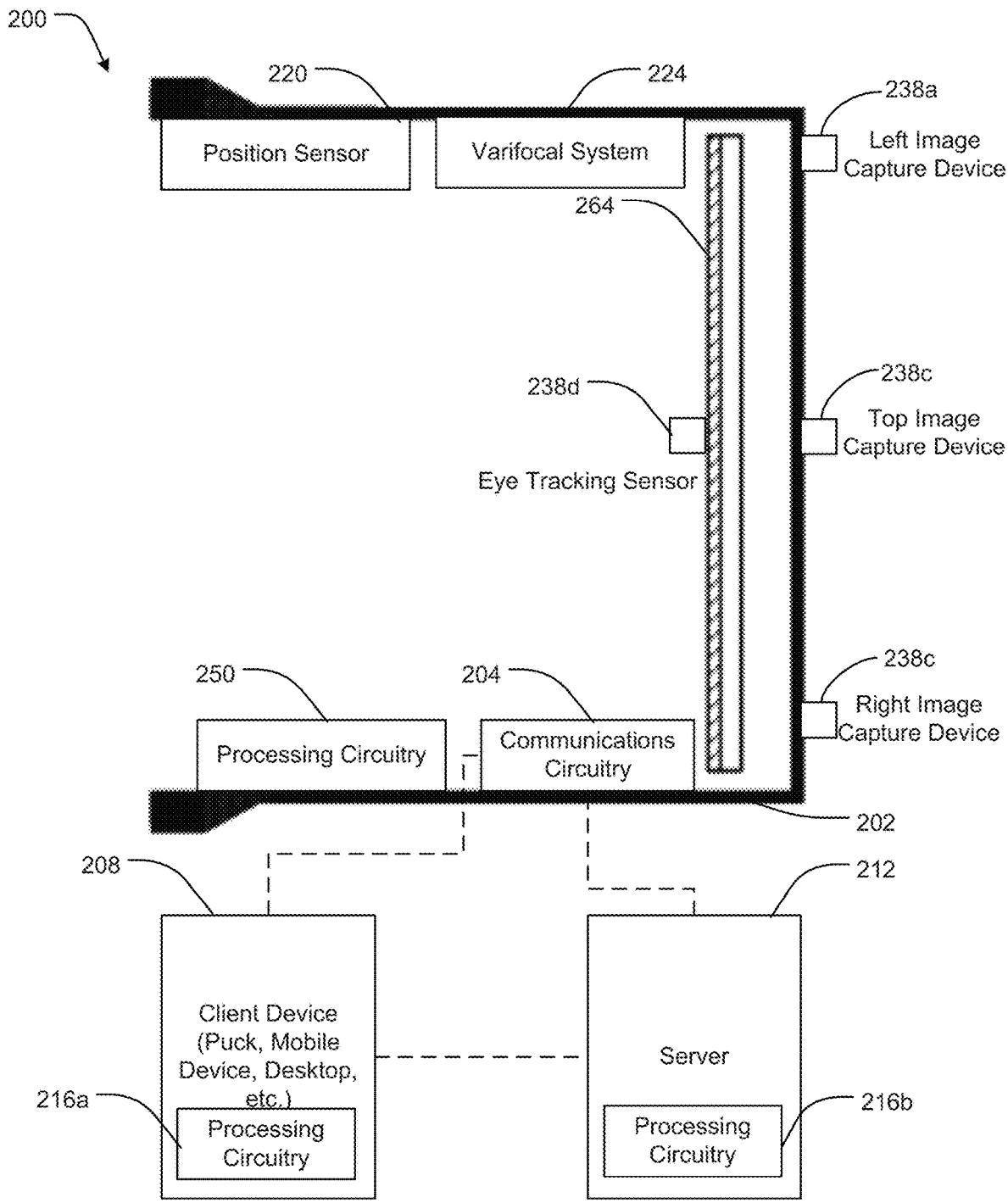
FIG. 2B is a schematic diagram of a head-mounted display (HMD) system, according to some embodiments.

The sensors 238 can include eye tracking sensors 238 or head tracking sensors 238 that can provide information such as positions, orientations, or gaze directions of the eyes or head of the user (e.g., wearer) of an HMD. In some embodiments, the sensors 238 are inside out tracking cameras configured to provide images for head tracking operations. The sensors 238 can be eye tracking sensors 238 that provide eye tracking data 248, such as data corresponding to at least one of a position or an orientation of one or both eyes of the user. The sensors 238 can be oriented in a direction towards the eyes of the user (e.g., as compared to sensors 238 that capture images of an environment outside of the HMD). For example, the sensors 238 can include at least one fourth sensor 238d (e.g., as illustrated in FIG. 2B) which can be oriented towards the eyes of the user to detect sensor data regarding the eyes of the user.

In some embodiments, the sensors 238 output images of the eyes of the user, which can be processed to detect an eye position or gaze direction of the eyes. In some embodiments, the sensors 238 process image data regarding the eyes of the user, and output the eye position or gaze direction based on the image data. In some embodiments, the sensors 238 optically measure eye motion, such as by emitting light (e.g., infrared light) towards the eyes and detecting reflections of the emitted light.

As discussed further herein, an eye tracking operation can include any function, operation, routine, logic, or instructions executed by the system 280 or components thereof to track data regarding eyes of the user, such as positions or orientations (e.g., gaze directions) of the eyes of the user as the eyes of the user move during use of the HMD. For example, the eye tracking operation can be performed using at least one of one or more sensors 238 or eye tracker 244. For example, the eye tracking operation can process eye tracking data 248 from the sensor 238 to determine an eye position 236 of eye(s) of the user. In some embodiments, the eye tracking operation can be performed using an eye tracker 244 that is implemented using a portion of processing circuitry 250 that is coupled with, mounted to, integral with, implemented using a same circuit board as, or otherwise provided with the one or sensors 238 that detect sensor data regarding the eyes of the user (and may be implemented using different processing hardware than at least one of the object position detector 222, or image renderer 260). In some embodiments, the eye tracking operation can be performed using an eye tracker 244 that receives sensor data by a wired or wireless connection from the one or more sensors 238 that are configured to detect sensor data regarding the eyes of the user (e.g., images of the eyes of the user); for example, the eye tracker 244 can be implemented using the same processing hardware as at least one of the object position detector 222, or image renderer 260. Various such combinations of sensor hardware of the sensors 238 and/or processing hardware of the processing circuitry 250 may be used to implement the eye tracking operation.

The eye tracker 244 can generate the eye position 236 in various manners. For example, the eye tracker 244 can process the eye tracking data 248 to identify one or more pixels representing at least one of a position or an orientation of one or more eyes of the user. The eye tracker 244 can identify, using the eye tracking data 248, the eye position 236 based on pixels corresponding to light (e.g., light from sensors 238, such as infrared or near-infrared light from sensors 238, such as 850 nm light eye tracking) reflected by the one or more eyes of the user. The eye tracker 244 can use light from various illumination sources or reflections in the HMD or AR system, such as from waveguides, combiners, or lens cameras. The eye tracker 244 can determine the eye position 236 or gaze direction by determining a vector between a pupil center of one or more eyes of the user and a corresponding reflection (e.g., corneal reflection). The eye position 236 can include position data such as at least one of a position or an orientation of each of one or more eyes of the user. The position data can be in three-dimensional space, such as three-dimensional coordinates in a Cartesian, spherical, or other coordinate system. The eye position 236 can include position data including a gaze direction of one or more eyes of the user.

In some embodiments, the eye tracker 244 includes a machine learning model. The machine learning model can be used to generate the eye position 236 based on eye tracking data 248. For example, the eye tracking data 248 can be applied as an input to the machine learning model, which can output the eye position 236 (or a gaze direction of the eye position 236). The machine learning model can be trained using training data that include historical eye tracking data 248 and corresponding historical or labeled eye positions 236, such as eye positions 236 that were determined to correspond to the eye tracking data 248. The machine learning model can be continuously updated using the eye tracking data 248 to enable continuous calibration of the eye tracking operation. The machine learning model can be trained by monitoring a difference between candidate output generated by the machine learning model and the historical eye positions 236, and modifying the machine learning model to reduce the difference. For example, an objective function or cost function can be evaluated using the difference, and the machine learning model can be modified using the objective function or cost function. In some embodiments, the machine learning model includes a neural network. The neural network can include a plurality of layers each including one or more nodes (e.g., neurons, perceptrons), such as a first layer (e.g., an input layer), a second layer (e.g., an output layer), and one or more hidden layers. The neural network can include characteristics such weights and biases associated with computations that can be performed between nodes of layers, which the processing circuitry 250 can modify to train the neural network using the training data.

The sensors 238 can capture images 234 of an environment around the sensors 238. For example, the sensors 238 can capture images 234 of an environment in or around a field of view of the user of the HMD. The images 234 can be representations of the environment, such as color or grayscale array or matrix of pixels representing parameters of light captured from the environment (e.g., color, brightness, intensity). The environment can be an indoor or outdoor environment, including both natural and man-made structures, terrain, or other objects, including sky, clouds, roads, buildings, streets, pedestrians, or cyclists. The environment can include one or more objects (e.g., real-world objects), which can be represented by the images 234 captured by the sensors.

The processing circuitry 250 can include an object position detector 222. The object position detector 222 can receive the image 234 from the sensors 238. The object position detector 222 can process the image 234 or portions thereof to detect one or more objects represented by the image 234. For example, the object position detector 222 can detect or identify objects represented by the image 234 by processing elements of the image 234 such as pixels or groups of pixels, such as by processing pixels or groups of pixels indicating colors, shapes, edges, contrast between pixels or groups of pixels, and spatial relationships between pixels. The object position detector 222 can detect objects by executing spatial filters, segmentation, or machine learning models trained to detect objects. The object position detector 222 can identify candidate objects from the image 234, such as groups of pixels representing edges, compare the candidate objects to one or more template objects (e.g., template objects or features thereof in an object database), and identify the objects of the image 234 based on candidate objects that match template objects. The object position detector 222 can apply various objection recognition algorithms or models to identify the objects. The objects can be real-world or simulated objects.

In some embodiments, the object position detector 222 does not specifically identify a type, class, or other identifier of the object in the image 234. The object position detector 222 can receive an indication from the sensors 238 that the object has been detected by the sensors 238. For example, the object position detector 222 can receive an indication that a particular image 234 represents an object (in which case the object position detector 222 can process the image 234 to identify one or more pixels corresponding to the object). In some embodiments, the indication can include one or more pixels corresponding to the object.

In some embodiments, the object position detector 222 detects the object using an object database that can include location data of various objects, buildings, structures, roads, or other indoor and outdoor features. For example, the object position detector 222 can communicate with an object database mapping objects or features of objects to position data. The object database may also maintain semantic or textual information regarding objects, such as information regarding type, class, shape, color, size, or other features regarding the objects. The object database can be based on reconstruction of environments using image data (which can be updated using images 234 detected by the sensors 238). The object database can be maintained, processed (e.g., to generate semantic or textual information or descriptors), and updated by a server remote from the system 280, which the system 280 can communicate with to access the object database. The object position detector 222 can receive data regarding the position of the HMD or AR system (e.g., from position sensor 220 described with reference to FIG. 2B), and use the data to retrieve one or more candidate objects from the object database. The object position detector 222 can compare the sensor data to the one or more candidate objects and information maintained by the object database regarding the one or more candidate objects to identify the object (e.g., by matching the sensor data to the information received from the object database).

The object position detector 222 can determine a position of the object using information received from the sensors 238, such as the image 234 or the indication that the image 234 represents an object. For example, the object position detector 222 can identify one or more pixels corresponding to the object. In some embodiments, the object position detector 222 determines the position of the object as a position in an image space of the image 234, such as by assigning one or more pixels corresponding to the object as the position of the object. In some embodiments, the object position detector 222 determines the position of the object as a position in three-dimensional space (e.g., real world space, AR or VR space, space in the environment around the HMD or AR system), such as by using depth information to determine the position of the object.

The object position detector 222 can determine a gaze direction using the position of the object, such as a gaze direction towards the position of the object. For example, the object position detector 222 can identify an expected position of the eyes of the user, and determine a vector from the eyes of the user to the position of the object (or vice versa). In some embodiments, the expected position includes a left eye position and a right eye position, and the object position detector 222 can determine the gaze direction using the left eye position and the right eye position, such as by averaging the left eye position and the right eye position, or averaging respective vectors from the left eye position to the position of the object and from the right eye position to the position of the object.

The processing circuitry 250 can detect that the user is gazing at the object. For example, the processing circuitry 250 can use sensor data regarding the eyes of the user or scene understanding, such as contextual information, to detect that the user is gazing at the object (e.g., as compared to other objects that the object position detector 222 has not determined the position of). The processing circuitry 250 can use any combination of sensor data to detect that the user is gazing at the object, such as by assigning a confidence score to each object regarding whether the user is gazing at the object, and determine the confidence score as a weighted average from contributions of the sensor data. The processing circuitry 250 can compare the confidence score to a threshold confidence, and detect that the user is gazing at the object responsive to the confidence score meeting or exceeding the threshold confidence. In some embodiments, the processing circuitry 250 assigns a relatively higher confidence score to the object based on the object being one of at most a threshold number of objects in the scene (e.g., in a field of view of the HMD). For example, if the object is the only object in the scene, then there may be a greater likelihood that the user is gazing at the object. If the object is detected to be or include a face, such as another person speaking, there may be a greater likelihood that the user is gazing at the object.

The processing circuitry 250 can include an image renderer 260. The image renderer 260 can be a 3D image renderer. The image renderer 260 may use image related input data to process, generate and render display or presentation images to display or present on one or more display devices, such as via an HMD. The image renderer 260 can generate or create 2D images of a scene or view for display on display 264 and representing the scene or view in a 3D manner. The display or presentation data to be rendered can include geometric models of 3D objects in the scene or view. The image renderer 260 may determine, compute or calculate the pixel values of the display or image data to be rendered to provide the desired or predetermined 3D image(s), such as 3D display data for the images 234 captured by the sensor 238. The image renderer 260 can receive the images 234 and receive the eye position 236, and generate display images using the images 234 and the eye position 236, such as to determine where to locate augmented reality information for presentation by displays 264 based on the eye position 236 (or gaze direction corresponding to the eye position 236).

The image renderer 260 can render frames of display data to one or more displays 264 based on temporal and/or spatial parameters. The image renderer 260 can render frames of image data sequentially in time, such as corresponding to times at which images are captured by the sensors 238. The image renderer 260 can render frames of display data based on changes in position and/or orientation to the sensors 238, such as the position and orientation of the HMD. The image renderer 260 can render frames of display data based on left-eye view(s) and right-eye view(s) such as displaying a left-eye view followed by a right-eye view or vice-versa.

The image renderer 260 can generate the display images using motion data regarding movement of the sensors 238a . . . n that captured the images 234a . . . k. For example, the sensors 238a . . . n may change in at least one of position or orientation due to movement of a head of the user wearing an HMD that includes the sensors 238a . . . n (e.g., as described with reference to HMD system 200 of FIG. 2B). The processing circuitry 250 can receive the motion data from a position sensor (e.g., position sensor 220 described with reference to FIG. 2B). The image renderer 260 can use the motion data to calculate a change in at least one of position or orientation between a first point in time at which the images 234a . . . k were captured and a second point in time at which the display images will be displayed, and generate the display images using the calculated change. The image renderer 260 can use the motion data to interpolate and/or extrapolate the display images relative to the images 234a . . . k.

Although the image renderer 260 is shown as part of the processing circuitry 250, the image renderer may be formed as part of other processing circuitry of a separate device or component, such as the display device, for example within the HMD.

The system 280 can include one or more displays 264. The one or more displays 264 can be any type and form of electronic visual display. The displays may have or be selected with a predetermined resolution and refresh rate and size. The one or more displays can be of any type of technology such as LCD, LED, ELED or OLED based displays. The form factor of the one or more displays may be such to fit within the HMD as glasses or goggles in which the display(s) are the leans within the frame of the glasses or goggles. The displays 264 may have a refresh rate the same or different than a rate of refresh or frame rate of the processing circuitry 250 or the image renderer 260 or the sensors 238. The displays 264 can include one or more waveguides (e.g., waveguides 228 described with reference to FIG. 2B), such that calibration of the eye tracking operation can be used to more accurately control operation of the waveguides using pupil locations indicated by the eye tracking.

Referring now to FIG. 2B, in some implementations, an HMD system 200 can be used to implement the system 280. The HMD system 200 can include an HMD body 202, a left sensor 238a (e.g., left image capture device), a right sensor 238b (e.g., right image capture device), and the display 264. The HMD body 202 can have various form factors, such as glasses or a headset. The sensors 238a, 238b can be mounted to or integrated in the HMD body 202. The left sensor 238a can capture first images corresponding to a first view (e.g., left eye view), and the right sensor 238b can capture images corresponding to a second view (e.g., right eye view).

The HMD system 200 can include a top sensor 238c (e.g., top image capture device). The top sensor 238c can capture images corresponding to a third view different than the first view or the second view. For example, the top sensor 238c can be positioned between the left sensor 238a and right sensor 238b and above a baseline between the left sensor 238a and right sensor 238b. This can enable the top sensor 238c to capture images with depth information that may not be readily available to be extracted from the images captured by the left and right sensors 238a, 238b. For example, it may be difficult for depth information to be effectively extracted from images captured by the left and right sensors 238a, 238b in which edges (e.g., an edge of a table) are parallel to a baseline between the left and right sensors 238a, 238b. The top sensor 238c, being spaced from the baseline, can capture the third image to have a different perspective, and thus enable different depth information to be extracted from the third image, than the left and right sensors 238a, 238b.

The HMD system 200 can include processing circuitry 250, which can perform at least some of the functions described with reference to FIG. 2A, including receiving sensor data from the sensors 238a, 238b, and 238c as well as eye tracking sensors 238, and processing the received images to calibrate an eye tracking operation.

The HMD system 200 can include communications circuitry 204. The communications circuitry 204 can be used to transmit electronic communication signals to and receive electronic communication signals from at least one of a client device 208 or a server 212. The communications circuitry 204 can include wired or wireless interfaces (e.g., jacks, antennas, transmitters, receivers, transceivers, wire terminals) for conducting data communications with various systems, devices, or networks. For example, the communications circuitry 204 can include an Ethernet card and port for sending and receiving data via an Ethernet-based communications network. The communications circuitry 204 can communicate via local area networks (e.g., a building LAN), wide area networks (e.g., the Internet, a cellular network), and/or conduct direct communications (e.g., NFC, Bluetooth). The communications circuitry 204 can conduct wired and/or wireless communications. For example, the communications circuitry 204 can include one or more wireless transceivers (e.g., a Wi-Fi transceiver, a Bluetooth transceiver, a NFC transceiver, a cellular transceiver). For example, the communications circuitry 204 can establish wired or wireless connections with the at least one of the client device 208 or the server 212. The communications circuitry 204 can establish a USB connection with the client device 208. The client device 208 can include processing circuitry 216a to facilitate communications between the client device 208 and the communications circuitry 204. Similarly, the server 212 can include processing circuitry 216b to facilitate communications between the server 212 and the communications circuitry 204. In some embodiments, the processing circuitry 216 is the same as or similar to communications circuitry 204 and/or processing circuitry 250. The processing circuitry 216 can be configured to perform any of the functions, processes, techniques, data processing, etc., of devices 302 described in greater detail below with reference to FIGS. 3A-3C.

The HMD system 200 can be deployed using different architectures. In some embodiments, the HMD (e.g., HMD body 202 and components attached to the HMD body 202) comprises the processing circuitry 250 and is self-contained portable unit. In some embodiments, the HMD has portions of the processing circuitry 250 that work in cooperation with or in conjunction with any type of portable or mobile computing device or companion device that has the processing circuitry or portions thereof, such as in the form of a staging device, a mobile phone or wearable computing device. In some embodiments, the HMD has portions of the processing circuitry 250 that work in cooperation with or in conjunction with processing circuitry, or portions thereof, of a desktop computing device. In some embodiments, the HMD has portions of the processing circuitry 250 that works in cooperation with or in conjunction with processing circuitry, or portions thereof, of a server computing device, which may be deployed remotely in a data center or cloud computing environment. In any of the above embodiments, the HMD or any computing device working in conjunction with the HMD may communicate with one or more servers in performing any of the functionality and operations described herein.

The client device 208 can be any type and form of general purpose or special purpose computing device in any form factor, such as a mobile or portable device (phone, tablet, laptop, etc.), or a desktop or personal computing (PC) device. In some embodiments, the client device can be a special purpose device, such as in the form of a staging device, which may have the processing circuitry or portions thereof. The special purpose device may be designed to be carried by the user while wearing the HMD, such as by attaching the client device 208 to clothing or the body via any type and form of accessory attachment. The client device 208 may be used to perform any portion of the image and rendering processing pipeline described in connection with FIGS. 1 and 3. The HMD may perform some or other portions of the image and rendering processing pipeline such as image capture and rendering to the display 264. The HMD can transmit and receive data with the client device 208 to leverage the client device 208's computing power and resources which may have higher specifications than those of the HMD.

The server 212 can be any type of form of computing device that provides applications, functionality or services to one or more client devices 208 or other devices acting as clients. In some embodiments, the server 212 can be a client device 208. The server 212 can be deployed in a data center or cloud computing environment accessible via one or more networks. The HMD and/or client device 208 can use and leverage the computing power and resources of the server 212. The HMD and/or client device 208 can implement any portion of the image and rendering processing pipeline described in connection with FIGS. 1 and 3. The server 212 can implement any portion of the image and rendering processing pipeline described in connection with FIGS. 1 and 3, and in some cases, any portions of the image and rendering processing pipeline not performed by client device 208 or HMD. The server 212 may be used to update the HMD and/or client device 208 with any updated to the applications, software, executable instructions and/or data on the HMD and/or client device 208.

The system 200 can include a position sensor 220. The position sensor 220 can output at least one of a position or an orientation of the body 202. As the image capture devices 238a, 238b, 238c can be fixed to the body 202 (e.g., at predetermined locations relative to the position sensor 220), the position sensor 220 can output at least one of a position or an orientation of each sensor 238a, 238b, 238c. The position sensor 220 can include at least one of an inertial measurement unit (IMU), an accelerometer, a gyroscope, or a magnetometer (e.g., magnetic compass).

The system 200 can include a varifocal system 224. The varifocal system 224 can have a variable focal length, such that the varifocal system 224 can change a focus (e.g., a point or plane of focus) as focal length or magnification changes. The varifocal system 224 can include at least one of a mechanical lens, liquid lens, or polarization beam plate.

In some embodiments, the display 264 includes one or more waveguides 228. The waveguides 228 can receive (e.g., in-couple) light corresponding to display images to be displayed by the display 264 from one or more projectors 232, and output (e.g., in-couple) the display images, such as for viewing by a user of the HMD. The waveguides 228 can perform horizontal or vertical expansion of the received light to output the display images at an appropriate scale. The waveguides 228 can include one or more lenses, diffraction gratings, polarized surfaces, reflective surfaces, or combinations thereof to provide the display images based on the received light. The projectors 232 can include any of a variety of projection devices, such as LCD, LED, OLED, DMD, or LCOS devices, among others, to generate the light to be provided to the one or more waveguides 228. The projectors 232 can receive the display images from the processing circuitry 250 (e.g., from image renderer 260). The one or more waveguides 228 can be provided through a display surface (e.g., glass), which can be at least partially transparent to operate as a combiner (e.g., combining light from a real world environment around the HMD with the light of the outputted display images).

Operation of the display 264 and components thereof, such as the one or more waveguides 228 or the one or more projectors 232, can be modified or controlled responsive to the calibration of the eye tracking operation. For example, the processing circuitry 250 an cause the one or more projectors 232 to provide the display images using the one or more waveguides 228 based on a pupil location corresponding to each eye of the user based on the calibrated eye tracking operation. The processing circuitry 250 can use the calibrated eye tracking operation to correct uniformity of the one or more waveguides 228 so that the display images provided via the one or more waveguides 228 are aligned with the gaze directions of the eyes of the user.

The display 264 can perform foveated rendering based on the calibrated eye tracking operation, which can indicate a gaze point corresponding to the gaze direction generated by the eye tracking operation. For example, the processing circuitry 250 can identify at least one of a central region of the FOV of the display 264 (e.g., a plurality of pixels within a threshold distance from the gaze point) peripheral region of the FOV of the display 264 based on the gaze point (e.g., a peripheral region represented by a plurality of pixels of the display images that are within a threshold distance of an edge of the display images or more than a threshold distance from the gaze point). The processing circuitry 250 can generate the display images to have a less quality (e.g., resolution, pixel density, frame rate) in the peripheral region than in the central region, which can reduce processing demand associated with operation of the HMD system 200.

C. Systems, Methods, and Devices for Distributing a Neural Network Across Multiple Devices Referring now to FIG. 3A, a system 300 includes a first device 302a, and a second device 302b, according to some embodiments. In some embodiments, the first device 302a is the HMD and/or AR system described in greater detail above with reference to FIGS. 2A-2B. In some embodiments, the first device 302a is computer device of the HMD and/or AR system described in greater detail above with reference to FIGS. 2A-2B. For example, the first device 302a may be a central processing unit (CPU) or a GPU of the HMD and/or AR system described in greater detail above with reference to FIGS. 2A-2B. In some embodiments, the first device 302a is a client device (e.g., client device 208), a mobile computer device, a computer with lower/less processing capabilities than second device 302b, an AI accelerator 108, etc. In some embodiments, the second device 302b is a remote device, an external device, a local but separate processing unit of the HMD and/or AR system, an AI accelerator 108, a mobile computing device, a server in the cloud, etc., or any device other than the first device 302a. For example, the second device 302b can be the server 212, a desktop computer, an external computer, a network computer, a remote computer, etc. In some embodiments, the second device 302b is any computer or computing device other than the first device 302a with greater or more processing capabilities than the first device 302a. In some embodiments, the first device 302a and the second device 302b are similar computing devices. In some embodiments, the system 300 shown in FIGS. 3A and 3C is referred to as a neural network "pipeline" that distributes neural network computations across multiple computing devices.

The first device 302a receives the input data 110 and outputs a reduced data set 310, according to some embodiments. The second device 302b can receive the reduced data set 310 as an input and output or provide the output data 112 to the first device 302a. In some embodiments, the first device 302a outputs the reduced data set 310 to the second device 302b if the first device 302a cannot accurately make a determination based on the input data 110.

The first device 302a and the second device 302b can each include a processing circuit 304a, a processor 306a, and memory 308a. Processing circuits 304 can be the same as or similar to processing circuitry 250. The first device 302a and the second device 302b can each include a communications interface that facilitates communications (e.g., the transfer of data) between the first device 302a and the second device 302b. The communications interfaces of first and second devices 302 can be or include wired or wireless communications interfaces (e.g., jacks, antennas, transmitters, receivers, transceivers, wire terminals, etc.) for conducting data communications between the first and second devices 302a and 302b. In various embodiments, communications via the communications interfaces can be direct (e.g., local wired or wireless communications) or via a communications network (e.g., a WAN, the Internet, a cellular network, etc.). For example, the interfaces can include an Ethernet card and port for sending and receiving data via an Ethernet-based communications link or network. In another example, the interfaces can include a Wi-Fi transceiver for communicating via a wireless communications network. In another example, one or both of the interfaces can include cellular or mobile phone communications transceivers. In some embodiments, both of the communications interfaces are Ethernet interfaces or USB interfaces.

Figure 3A:
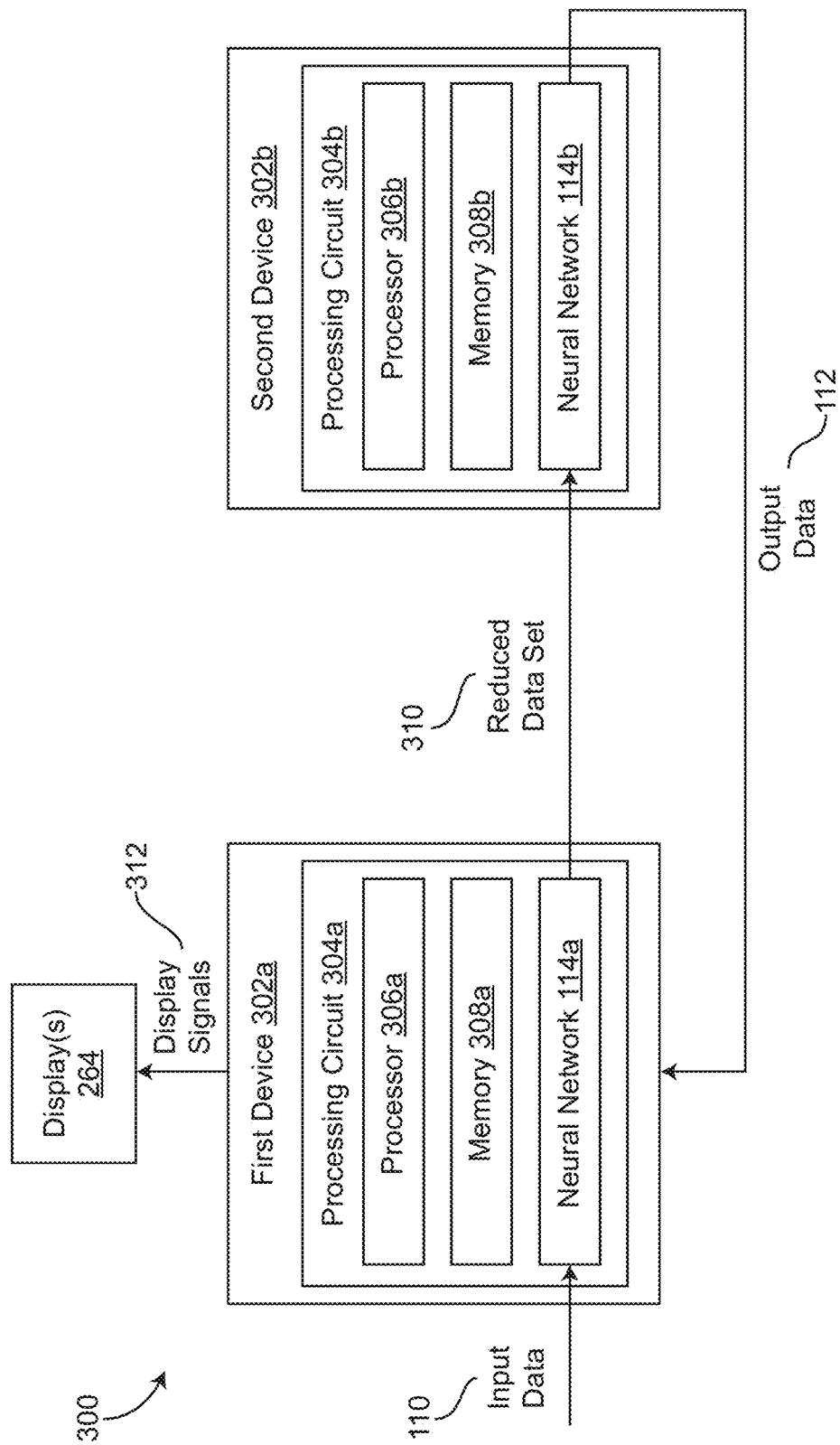
FIG. 3A is a block diagram of a system of controllers that use portions of a neural network to identify features of input data and perform an action, according to some embodiments.

Still referring to FIG. 3A, the first and second devices 302a and 302b are shown to include a processing circuit 304 including a processor 306 and memory 308. The processing circuit 304 can be communicably connected to the communications interface such that the processing circuit 304 and the various components thereof can send and receive data via the communications interface. The processor 306 can be implemented as a general purpose processor, an application specific integrated circuit (ASIC), one or more field programmable gate arrays (FPGAs), a group of processing components, or other suitable electronic processing components.

The memory 308 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 308 can be or include volatile memory or non-volatile memory. The memory 308 can include database components, object code components, script components, or any other type of information structure for supporting the various activities and information structures described in the present application. According to some embodiments, the memory 308 is communicably connected to the processor 306 via the processing circuit 304 and includes computer code for executing (e.g., by the processing circuit 304 and/or the processor 306) one or more processes described herein.

The first device 302a can receive the input data 110 from any sensors, systems, devices, etc., described in the present disclosure. For example, the input data 110 can be eye tracking data, image data, camera data, object detection data, data regarding one or more virtual objects including vertices, textures, edges, surfaces, etc. In some embodiments, the input data 110 is any of the gaze direction 230, the eye position 236, the eye tracking data 248, data collected by the sensors 238, the images 234, data output by the image renderer 260, etc.

The first device 302a includes a first set of one or more layers of a neural network (e.g., one or more of layers 116-122, or one or more layers similar to layers 116-122) or a first neural network, shown as neural network 114a. Similarly, the second device 302b includes a second set of one or more layers of a neural network (e.g., one or more of layers 116-122, or one or more layers similar to layers 116-122) or a second neural network, shown as neural network 114b. In some embodiments, neural network 114a is a first set of 1:x layers of a neural network (e.g., neural network 114) that has 1:n total layers. In some embodiments, neural network 114b is a second set of x:n layers of the same neural network (e.g., neural network 114) that has 1:n total layers. In some embodiments, the neural network 114a and neural network 114b are considered as a separate and independent neural networks with their own input, output, and hidden layers. In some embodiments, the neural network 114a is implemented on any of the processing circuit 304a, the processor 306a, and the memory 308a. For example, the memory 308a can store the neural network 114a for implementation and processing on the processor 306a and/or the processing circuit 304a. In some embodiments, the first device 302a is or includes the GPU of the HMD and/or AR system and the neural network 114a is implemented on the GPU. Likewise, the first device 302a can be or include the CPU and/or an AI accelerator (e.g., AI accelerator 108, an AI accelerator similar to AI accelerator 108, etc.) for implementation of the neural network 114a thereon.

The neural network 114a can be implemented to identify one or more features of the input data 110. In some embodiments, the first device 302a uses the one or more identified features of the input data 110 for further analysis, data processing, image display, performing actions, etc. The neural network 114a can be implemented by the first device 302a to detect one or more features of the input data 110. In some embodiments, the first device 302a outputs an indication or a notification to the second device 302b that the one or more features are detected by the neural network 114a or that the one or more features are not detected by the neural network 114a. The second device 302b can use the indication or the notification to determine if the reduced data set 310 should be used as an input to the neural network 114b.

In some embodiments, the first device 302a outputs any of the one or more identified features of the input data 110 to the second device 302b as the reduced data set 310. For example, if the first device 302a is processing image data to identify an object, a person, a shape, etc., the first device 302a can provide the image data (e.g., the input data 110) to the neural network 114a to identify the object, person, shape, etc. If further analysis and/or identification of the object, person, shape, etc., is required, the neural network 114a can output the reduced data set 310 including the image data of the identified object, person, shape, etc., to the second device 302b for additional feature identification and/or detection. For example, if the input data 110 is image data and the neural network 114a is configured to identify if a person is present in the image data, the neural network 114a can identify if a person is present in the image data, and output image data associated with the person as the reduced data set 310 to the neural network 114b of the second device 302b for further identification if required. The second device 302b can receive the reduced data set 310 and identify additional features of the person (e.g., facial expression, mood, age, etc.).

In some embodiments, the outputs of the neural network 114a and/or the neural network 114b (e.g., the output data 112 and/or the reduced data set 310) include a detection of whether certain features exist in the input data (e.g., the input data 110 and/or the reduced data set 310). In some embodiments, the outputs of the neural network 114a and/or the neural network 114b include detection, with a certain accuracy or threshold, of an object in a certain location, detection of eyes in a certain direction, gaze, etc. For example, the output of the neural network 114a and/or the neural network 114b can include any of identification of the object or feature in the input data 110, and/or an accuracy/error score (e.g., accuracy a and/or error e). In some embodiments, the output of the neural network 114a and/or the neural network 114b include a determination of an action or the action to be taken by one of the first device 302a and/or the second device 302b. In some embodiments, the output of the neural network 114a and/or the neural network 114b includes an indication of whether certain features or objects are not present (e.g., do not exist) in the input data (e.g., the input data 110) within a certain threshold (e.g., a certain threshold of accuracy a and/or a certain threshold of error e). For example, the neural network 114a and/or the neural network 114b can determine with a level of certainty (e.g., with a degree of error e and/or accuracy a) that a certain object or feature is not present in the input data 110.

In some embodiments, the first device 302a outputs the reduced data set 310 to the second device 302b for further analysis or processing in response to the identified or detected features of the input data 110 being insufficient for performing an action. For example, if the first device 302a requires additional features of the input data 110 to be identified before performing an action, and the features identified or detected by neural network 114a do not include the additional features, the first device 302a can output the reduced data set 310 to the second device 302b.

In some embodiments, the reduced data set 310 is smaller in size, compressed, reduced in size, etc., compared to the input data 110. For example, if the input data 110 is image data that is 5 megabytes, the reduced data set 310 may be image data that is 1 megabyte. In some embodiments, the neural network 114a is configured to receive the input data 110 and output the reduced data set 310 that is reduced in size. In some embodiments, the neural network 114a is configured to receive the input data 110 and compress the input data 110 to generate the reduced data set 310. In some embodiments, the neural network 114a uses any of lossy or lossless compression to generate the reduced data set 310 based on the input data 110. The lossy or lossless data (i.e., the reduced data set 310) can then be communicated between and understood by the first device 302a and the second device 302b. In some embodiments, the reduced data set 310 is a subset of the input data 110. In some embodiments, the reduced data set 310 is portions of the input data 110 selected by the neural network 114a. For example, the neural network 114a can determine that certain features are detected in certain portions of the input data 110 with an acceptable level of accuracy a and/or error e but that other features or objects cannot be detected in other portions of the input data 110 with the acceptable level of accuracy a and/or error e. The neural network 114a can output the other portions of the input data 110 as the reduced data set 310 to the neural network 114b since the rest of the input data 110 (e.g., the portions of the input data 110 for which features and/or objects are detected by the neural network 114a with the threshold level of accuracy a and/or error e) is not required for additional processing.

In some embodiments, the first device 302a is configured to determine an accuracy, an error, a confidence, an error matrix, a confusion matrix, etc. of the one or more features of the input data 110 identified by the neural network 114a. For example, the first device 302a can generate or update a confusion matrix that identifies prediction accuracy of the neural network 114a. The first device 302a can identify a confidence interval, an error, a prediction error, accuracy, etc., of the neural network 114a, hereinafter referred to as the "accuracy" a of the neural network 114a. In some embodiments, the accuracy a is a normalized value (e.g., a value from 0 to 1, where 0 is lowest accuracy and 1 is highest accuracy). In some embodiments, the accuracy a is a percentage (e.g., from 0% to 100%, where 0% is the lowest accuracy and 100% is the highest accuracy). In some embodiments, the first device 302a uses the accuracy a of the neural network 114a to determine if further data analysis should be performed using the neural network 114b of the second device 302b. In some embodiments, the first device 302a compares the accuracy a to a threshold value $a_{threshold}$ to determine if the neural network 114b of the second device 302b should be used to further analyze the input data 110. In some embodiments, if the accuracy a meets or exceeds the threshold value $a_{threshold}$ (or is less than or equal to if considering error), the first device 302a determines that the neural network 114a is sufficiently accurate and the reduced data set 310 is not provided to the second device 302b. In some embodiments, if the accuracy is less than the threshold value $a_{threshold}$ (or greater than or equal to if considering error), the first device 302a determines that further or additional data analysis should be performed on the input data 110 and provides the reduced data set 310 to the second device 302b.

In some embodiments, the first device 302a uses the accuracy a and the threshold value $a_{threshold}$ to determine if results of the neural network 114a (e.g., the identified/detected features of the input data 110) are sufficiently accurate for performing one or more actions. For example, if $a > a_{threshold}$ or $a \geq a_{threshold}$, the first device 302a can determine that the results or outputs of the neural network 114a are sufficient for performing one or more actions. In some embodiments, if $a > a_{threshold}$ or $a \geq a_{threshold}$, the first device 302a performs the one or more actions without providing the reduced data set 310 to the second device 302b. In this way, the first device 302a can reduce processing time, and number of transmissions between the first device 302a and the second device 302b, thereby saving energy consumption and bandwidth. Advantageously, this reduces traffic between the first device 302a and the second device 302b, reduces latency associated with transmitting data, and reduces the cost of transferring data between the first device 302a and the second device 302b (e.g., decreases energy consumption).

In some embodiments, the first device 302a determines an accuracy a or error e for each output (e.g., for each feature of the input data 110 identified/detected by the neural network 114a) of the neural network 114a. In some embodiments, the first device 302a compares the accuracy a and/or the error e for each output of the neural network 114a to a corresponding threshold value $a_{threshold}$ and $e_{threshold}$, respectively. In some embodiments, the first device 302a outputs the reduced data set 310 in response to the accuracy a being less than the corresponding threshold value $a_{threshold}$ or in response to the error e being greater than the corresponding threshold value $e_{threshold}$ for one or more of the outputs of the neural network 114a. In some embodiments, the reduced data set 310 includes information that is required for the neural network 114b to identify features of the input data 110 associated with insufficient accuracy a and/or excessive error e. For example, if neural network 114a can accurately identify four of five features of the input data 110 but cannot accurately identify the fifth feature of the input data 110 (e.g., $e_5 > e_{threshold}$ or $a_5 < a_{threshold}$, where $e_5$ and $a_5$ are the error and accuracy of the fifth feature as identified by the neural network 114a), the neural network 114a can output the input data 110 associated with the fifth feature to the neural network 114b as the reduced data set 310. The neural network 114b can use the reduced data set 310 to accurately identify the fifth feature and provide the identified fifth feature as output data 112 to the first device 302a.

In some embodiments, the output of the neural network 114b is provided to the first device 302a as the output data 112. The output data 112 can include information or data regarding any additional features identified by the network 114b or features of the input data 110 that are more accurately identified by the neural network 114b.

In some embodiments, the first device 302a is configured to perform an action in response to or based on any of the features of the input data 110 identified by the neural network 114a and/or the neural network 114b. For example, the first device 302a can generate display signals 312 for the display 264 based on, using, or in response to any of the features of the input data 110 identified by the neural network 114a and/or the neural network 114b. The first device 302a can generate the display signals 312 and provide the display signals 312 to the display 264 to provide different imagery to a user, change a size, shape, orientation, rotation, skew, appearance, color, etc., of any images provided to the user on display 264, etc. In some embodiments, the first device 302a is configured to update or provide new imagery using the display 264 in response to any of the features of the input data 110 as identified by the neural network 114a of the first device 302a or in response to any of the features of the reduced data set 310 as identified by neural network 114b of the second device 302b.

In some embodiments, the second device 302b is also configured to perform any of the actions described herein. In some embodiments, both the first device 302a and the second device 302b can perform one or more actions based on the output of the neural network 114a and/or the neural network 114b. For example, the first device 302a can perform a first action in response to the output of the neural network 114a (or in response to the output data 112 of the second neural network 114b, or in response to the outputs of both the first and second neural networks 114) while the second device 302b can perform a second action in response to the output data 112 of the second neural network 114b (or in response to the output of the first neural network 114a, or in response to the output of both the first neural network 114a and the second neural network 114b). In some embodiments, the first device 302a can perform a first action in response to or based on processings of the neural network 114a while the second device 302b performs a second action in response to or based on processings of the neural network 114b, where the neural network 114a and the neural network 114b use the same input data (e.g., the input data 110).

In some embodiments, the first device 302a is configured to perform the action without providing the reduced data set 310 to the second device 302b. In some embodiments, the first device 302a is configured to perform actions associated with one or more identified features of the input data 110 in response to the one or more features identified by the neural network 114a being identified with sufficient accuracy or with sufficient error. For example, if a first feature of the input data 110 is identified with a corresponding accuracy $a_1$ (or error $e_1$) and $a_1 > a_{threshold}$ (or $e < e_{threshold}$), the first device 302a can perform associated actions (e.g., changing or providing new imagery to the user using the display 264) without transmitting the reduced data set 310 to the second device 302b. In some embodiments, if the accuracy a of the identified feature is less than the corresponding threshold value $a_{threshold}$ (or the error e of the identified feature is greater than the corresponding threshold value $e_{threshold}$), the first device 302a provides the reduced data set 310 to the neural network 114b. In some embodiments, the first device 302a can then receive the outputs of the neural network 114b (i.e., the output data 112) and use the outputs of the neural network 114b to perform the action. In some embodiments, the output data 112 is provided to the image renderer 260, a post-processing engine, a data rendering service, an image rendering engine, data storage, etc., to perform the action.

In some embodiments, the first device 302a both uses the features of the input data 110 as identified by the neural network 114a to perform an action and also outputs the reduced data set 310 to the second device 302b. For example, if the neural network 114a can accurately identify a first feature of the input data 110 (e.g., with the accuracy a being greater than the threshold value $a_{threshold}$ and/or the error e being less than the threshold value $e_{threshold}$), but does not accurately identify a second feature of the input data 110 (e.g., the accuracy a of the second feature is less than the threshold value $a_{threshold}$ and/or the error e of the second feature is greater than the threshold value $e_{threshold}$), the first device 302a can use the identified first feature to perform an associated action and provide the reduced data set 310 to the neural network 114b to identify the second feature. The neural network 114b can use the reduced data set 310 to identify the second feature with sufficient accuracy a and/or sufficiently low error e and provide information associated with the identified second feature to the first device 302a as the output data 112. The first device 302a can then use the output data 112 received from the second device 302b to perform one or more actions associated with the second feature.

Referring particularly to FIG. 3C, system 300 is shown, according to some embodiments. In some embodiments, additional devices 302 are communicably connected in series. Devices 302 can be communicably connected through a wired connection or through a wireless connection (e.g., a wireless communications network). For example, system 300 can include devices 302a ... n. The first device 302a provides a reduced data set 310a to the second device 302b, the second device 302b provides a reduced data set 310b to a third device 302c, etc. Each of devices 302a ... n include a corresponding neural network 114 or additional layers of a neural network 114. For example, the neural network 114 may have n layers, with a first set of one or more layers being implemented on the first device 302a, a second set of one or more layers being implemented on the second device 302b, etc. In this way, the neural network 114 can be distributed across multiple devices.

Each of the devices 302 can provide an output of the corresponding neural network 114 or the corresponding layers of the neural network 114 that are implemented locally to the first device 302a as output data 112. For example, the second device 302b can provide output data 112a to the first device 302a, the third device 302c can provide output data 112b to the first device 302a, ..., and the nth device 302n can provide output data 112n to the first device 302a. In some embodiments, each device 302 is configured to determine errors e and/or accuracy a of each output (e.g., each identified feature) of their corresponding neural networks 114. In some embodiments, if the error e of an output is less than the threshold value $e_{threshold}$, the output is provided to the first device 302a as output data 112. Likewise, if the accuracy a of an output is greater than or equal to the threshold value $a_{threshold}$, the output is provided to the first device 302a as output data 112, according to some embodiments.

In some embodiments, if the error e is greater than (or greater than or equal to) the threshold value $e_{threshold}$, the corresponding device 302 generates a reduced data set 310 and provides the reduced data set 310 to the next device 302. Likewise, if the accuracy a of an output is less than (or less than or equal to) the threshold value $a_{threshold}$, the corresponding device 302 (the device 302 that generates the output) generates a reduced data set 310 and provides the reduced data set 310 to the next device 302. In some embodiments, the reduced data set includes information/data for the next device 302 to analyze only the outputs that cannot be accurately analyzed/identified by the upstream device 302. In some embodiments, the reduced data set includes all information/data for the next device 302 to determine/identify all relevant/required features of the input data 110.

In this way, if a device 302 is unable to accurately predict, analyze, output, etc., a feature of input data (e.g., input data 110 or a reduced data set 310), the device 302 can generate a reduced data set 310 and provide the reduced data set 310 to the next device 302. The next device 302 can then use to reduced data set 310 to analyze, predict, output, identify, detect, etc., the features of the input data (e.g., the reduced data set 310) provided to it by the directly upstream device 302. This can be repeated until all required features of the input data 110 are identified/detected.

Figure 3B:
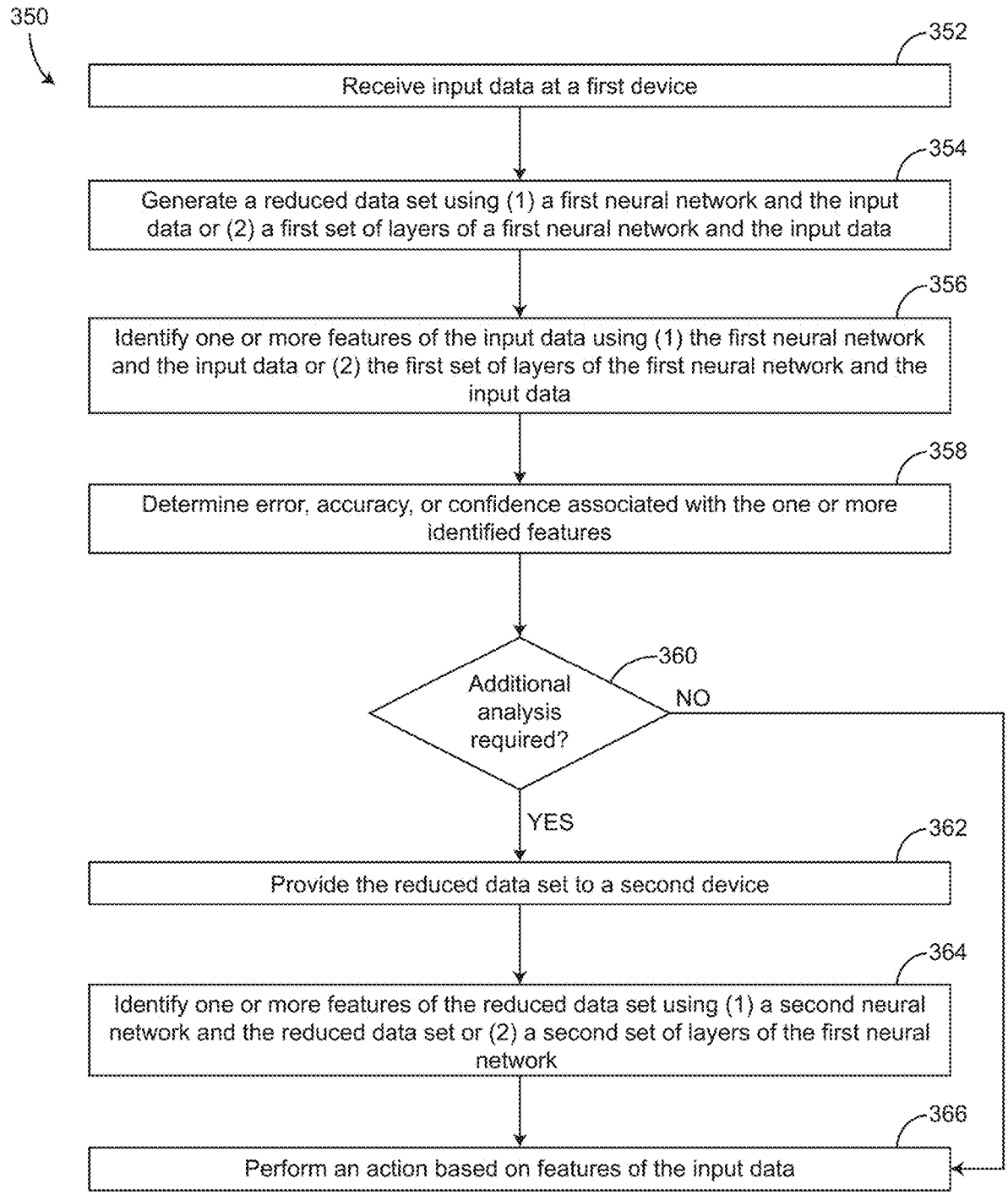
FIG. 3B is a flow diagram of a process for using a neural network distributed across multiple devices to identify one or more features of input data and perform an action, according to some embodiments.
Figure 3C:
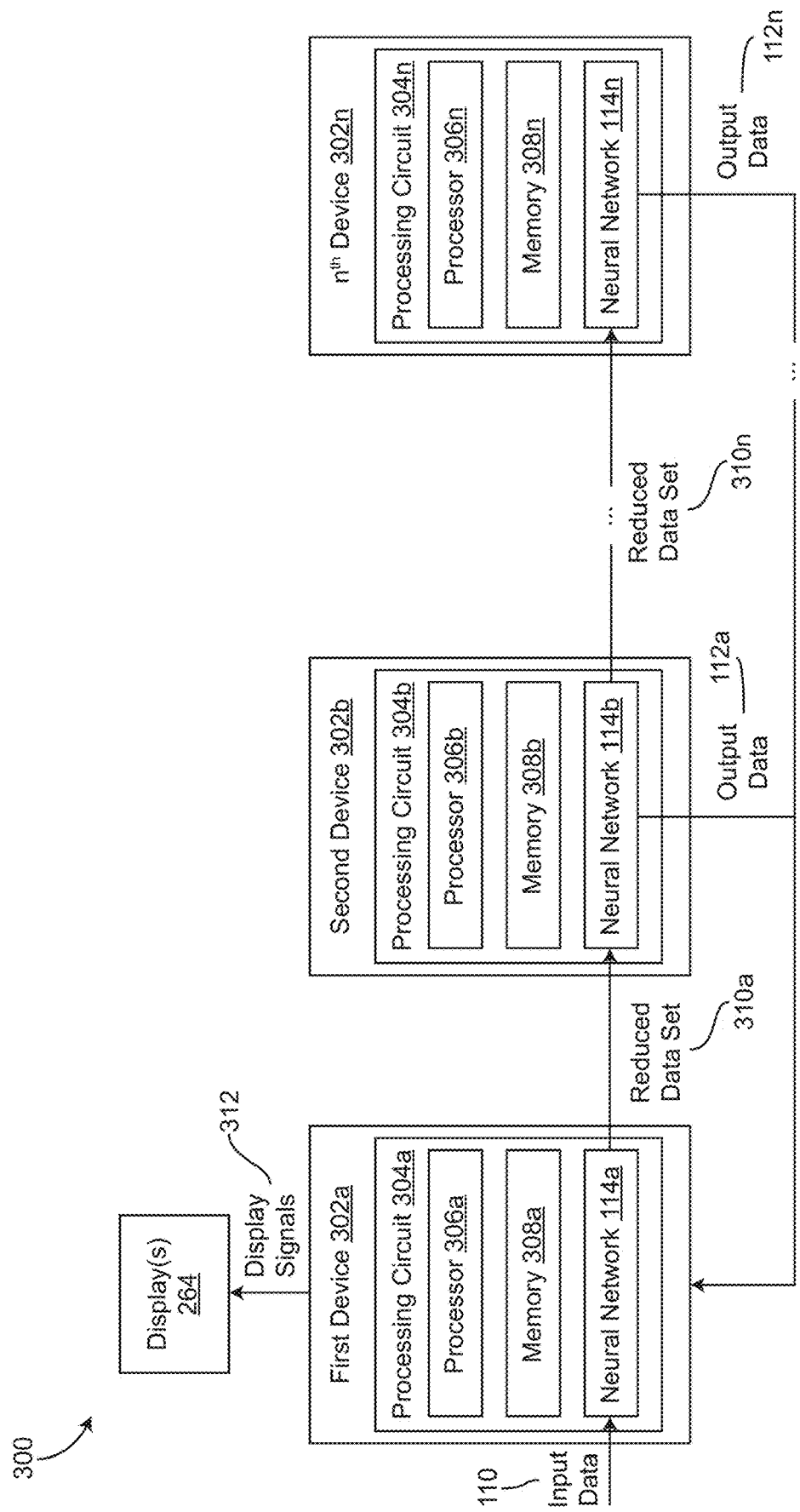
FIG. 3C is a block diagram of the system of FIG. 3A with additional devices, according to some embodiments.

Referring particularly to FIG. 3B, a process 350 for implementing a neural network across multiple devices or for cooperatively implementing multiple neural networks across multiple devices is shown, according to some embodiments. The process 350 includes steps 352-366, according to some embodiments. The process 350 can be performed by any of the devices, components, etc., of the system 300. Advantageously, the process 350 reduces transmission between devices and enables the devices to reduce processing requirements, thereby facilitating energy savings. The process 350 can be beneficial for an HMD and/or AR system which may have a local processing unit (e.g., a GPU, a CPU, processing circuitry, etc.). Advantageously, process 350 enables the local processing unit to reduce processing requirements to identify feature of input data or to implement a neural network which may be computationally heavy. The local processing unit can implement a respective neural network or a portion (e.g., certain layers) of a neural network to identify features of input data and use the identified features to perform an action at a display of the HMD and/or the AR system. If the local processing unit is unable to accurately identify the features of the input data, the local processing unit can provide a reduced data set to another processing unit (e.g., an external processing unit, a second processing unit, a second local processing unit, an AI accelerator, a remote device, etc.) that can identify the features accurately. In this way, the processing requirements of the local processing unit of the HMD and/or the AR system are reduced and the data transfer frequency and size between the local processing unit and the other processing unit are decreased, thereby reducing latency in the communications between the local processing unit and the other processing unit.

The process 350 includes receiving input data at a first device (step 352), according to some embodiments. In some embodiments, the input data is received from an external device. In some embodiments, the input data is received from sensors, cameras, etc., of the HMD and/or the AR system. In some embodiments, the input data is image data either provided by the external device or captured by the sensors, cameras, etc., of the HMD and/or the AR system. In some embodiments, the image data is image data of objects, an environment, a virtual environment, a real-world environment, people, landscapes, irregular shapes, particles, etc. In some embodiments, step 352 is performed by first device 302a. In some embodiments, the input data is received by neural network 114a.

The process 350 includes generating a reduced data set using either (1) a first neural network and the input data or (2) a first set of layers of a first neural network and the input data (step 354), according to some embodiments. In some embodiments, step 354 is performed by the neural network 114a using the input data received or obtained in step 352 (e.g., the input data 110). In some embodiments, step 354 is performed locally at the first device. In some embodiments, the neural network used at the first device to perform step 354 is an independent neural network. In some embodiments, the neural network used at the first device to perform step 354 is a first one or more layers of a neural network that is distributed across multiple devices.

Process 350 includes identifying one or more features of the input data using either (1) the first neural network and the input data or (2) the first set of layers of the first neural network and the input data (step 356), according to some embodiments. In some embodiments, step 356 is performed by the neural network 114a of the first device 302a. In some embodiments, step 356 includes identifying or detecting at least one feature of the input data using the associated neural network. In some embodiments, step 354 and/or step 356 are performed concurrently or simultaneously. In some embodiments, step 356 is performed prior to performing step 354. In some embodiments, step 356 is performed in response to step 360 (e.g., in response to step 360, "YES").

Process 350 includes determining an error, accuracy, confidence, etc., associated with the one or more features (e.g., the outputs of the neural network of step 356) identified in step 356 (step 358), according to some embodiments. In some embodiments, the error e and/or the accuracy a are determined by the first device 302a. The error e and/or the accuracy a can be used to determine if the one or more features identified by the neural network 114a are sufficiently accurate (e.g., used in step 360).

Process 350 includes determining if additional analysis is required (step 360), according to some embodiments. In some embodiments, step 360 is performed to determine if the reduced data set should be generated and/or if the reduced data set should be provided to a second device. In some embodiments, step 360 is determined based on the accuracy a and/or the error e of the one or more features of the input data identified in step 356. In some embodiments, step 360 includes comparing the accuracy a and/or the error e to corresponding threshold values (i.e., $a_{threshold}$ and $e_{threshold}$, respectively). In response to the accuracy a being greater than (or equal to) the threshold value $a_{threshold}$, the first device 302a can determine that additional analysis is not required (step 360, "NO") and process 350 proceeds to step 366. In response to the error e being less than the threshold value $e_{threshold}$, the first device 302a can determine that additional analysis is not required (step 360, "NO") and process 350 proceeds to step 366. In response to the accuracy a being less than the threshold value $a_{threshold}$, the first device 302a can determine that additional analysis is required (step 360, "YES") and process 350 proceeds to step 362. In response to the error e being greater than the threshold value $e_{threshold}$, the first device 302a can determine that additional analysis is required (step 360, "YES") and process 350 proceeds to step 362.

Process 350 includes providing the reduced data set to the second device (step 362), according to some embodiments. In some embodiments, the second device is a network device, an external device, an AI accelerator (e.g., AI accelerator 108), another computing device, etc. In some embodiments, the second device includes a second neural network or additional layers of the first neural network that can be used to further analyze the input data to identify features. In some embodiments, the second device has additional processing capabilities when compared to the first device. In some embodiments, step 362 is performed through a network, a wireless connection between the first and the second device, a wired connection between the first and the second device, etc.

Process 350 includes identifying one or more features of the reduced data set using either (1) a second neural network and the reduced data set or (2) a second set of layers of the first neural network (step 364), according to some embodiments. In some embodiments, the reduced data set is output by the first device (e.g., by the first neural network or the first set of layers of the first neural network) and provided to the neural network or the layers of the neural network of the second device as an input. In some embodiments, the second device is the second device 302b. In some embodiments, step 364 is performed by neural network 114b.

Process 350 includes performing an action based on features of the input data (step 366), according to some embodiments. In some embodiments, step 366 is performed by the first device 302*a*. In some embodiments, step 366 is performed by the first device 302*a* and the display(s) 264. For example, the first device 302*a* can generate display signals and provide the display signals to the display 264 to perform the action. In some embodiments, the action includes providing additional imagery to the user via the display 264, changing imagery that is currently displayed to the user via the display 264, performing additional data processing, performing a post-processing algorithm, etc. In some embodiments, the additional imagery provided to the user via the display 264 is or includes textual information (e.g., overlaid in an AR system), computer generated imagery (e.g., objects, characters, particles, textures, etc.), etc. In some embodiments, step 366 is performed based on any of the features of the input data and the reduced data set identified in steps 356 and/or 364. In some embodiments, the action includes operating display 264 to provide imagery to the user.

Configuration of Illustrative Embodiments

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
  receiving, by processing circuitry of a first device configured with a first one or more layers of a neural network trained to identity one or more features in input data, input data for processing via the neural network implemented across the processing circuitry of the first device and processing circuitry of a second device;
  outputting, by the first one or more layers of the neural network implemented on processing circuitry of the first device, a data set that is reduced in size relative to a size of the input data while identifying one or more features of the input data for processing by a second one or more layers of the neural network;
  determining that an accuracy associated with a first feature of the one or more features in the data set is outside a range of acceptable values;
  determining that an accuracy associated with a second feature of the data set is within the range of acceptable values; and
  communicating, by the processing circuitry of the first device responsive to the determination that the accuracy associated with the first feature is outside the range of acceptable values, a first portion of the data set that is reduced in size relative to the size of the input data and associated with the first feature to the second device for processing via the second one or more layers of the neural network implemented on the processing circuitry of the second device while performing an action on the second feature on first device and foregoing communicating to the second device a second portion of the data set associated with the second feature responsive to the determination that the accuracy associated with the second feature is within the range of acceptable values.

2. The method of claim 1, further comprising reducing, by the first one or more layers, the data set by compressing the data set for transmission via a network to the processing circuitry of the second device.

3. The method of claim 1, wherein the second one or more layers determine if a particular feature is one of the one or more features within the input data.

4. The method of claim 3, further comprising receiving, by the processing circuitry of the first device, an indication from the processing circuitry of the second device that the particular feature was detected by the second one or more layers.

5. The method of claim 1, further comprising detecting, by processing circuitry of the first device, that a particular one of the one or more features meets a threshold of accuracy to take an action by the processing circuitry of the first device.

6. The method of claim 5, further comprising performing, by the processing circuitry of the first device responsive to the detection, the action with respect to the particular one of the one or more features.

7. The method of claim 6, further comprising performing the action without communicating the data set to the processing circuitry of the second device.

8. A method comprising
  receiving, by a processor of a wearable head display, input data captured by the wearable head display;
  generating, by a first one or more layers of a neural network implemented on the processor and trained to identify one or more features in input data, a data set that is reduced in size relative to a size of the input data while identifying one or more features of the input data for processing by a second one or more layers of the neural network;

determining an accuracy associated with a first feature of the one or more features in the data set is outside a range of acceptable values; and determining an accuracy associated with a second feature of the data set is within the range of acceptable values;

in response to the accuracy associated with the first feature of the one or more features in the data set is outside a range of acceptable values:

communicating, by the processor of the wearable head display, first portion of the data set that is reduced in size relative to the size of the input data and associated with the first feature to a second device for processing via the second one or more layers of the neural network implemented on processing circuitry of the second device;

in response to the accuracy associated with the second feature of the data set being within the range of acceptable values:

performing, by the processor, an action with respect to the second feature on the processor of the wearable head display instead of communicating the portion of the data set associated with the second feature to the second device.

9. The method of claim 8, further comprising performing the action comprising modifying an image being displayed via the wearable head display.

10. The method of claim 8, further comprises generating, by the first one or more layers implemented on the processor, the portion of the data set as a second data set that is reduced in size relative to a second input data while identifying a second one or more of features in the second input data.

11. The method of claim 10, further comprises determining if an accuracy associated with a specific one of the second one or more features is outside a range of acceptable values.

12. The method of claim 11, further comprising communicating, by the processor responsive to the determination, the second data set to the second device implementing the second one or more layers of the neural network.

13. The method of claim 12, further comprising receiving, by the processor, from the second device an indication of a result of processing of the second data set by the second one or more layers.

14. A system comprising:
a first device comprising processing circuitry configured to receive input data for processing via a neural network implemented across the processing circuitry of the first device and processing circuitry of a second device, wherein the neural network is trained to identify one or more features within input data;

where a first one or more layers of the neural network implemented on the processing circuitry of the first device is configured to output a data set that is reduced in size relative to a size of the input data while identifying one or more features of the input data for processing by a second one or more layers of the neural network, responsive to a determination that an accuracy associated with a first feature of the one or more features in the data set is outside a range of acceptable values and a second feature of one or more feature in the data set is within the range of acceptable values; and wherein the processing circuitry of the first device is configured to communicate a first portion of the data set that is reduced in size relative to the size of the input data and associated with the first feature to the processing circuitry of the second device for processing via the second one or more layers of the neural network implemented on the processing circuitry of the second device while performing an action on the second feature on the first device and foregoing communicating to the second device a second portion of the data set associated with the second feature.

15. The system of claim 14, wherein the first one or more layers is further configured to reduce the data set by compressing the data set for transmission via a network to processing circuitry of the second device.

16. The system of claim 14, wherein the second one or more layers is further configured to detect the specific one of the one or more features within the input data.

17. The system of claim 16, wherein the first device is further configured to receive an indication from the second device that the specific one of the one or more features was detected by the second one or more layers.

18. The system of claim 14, wherein the first device is further configured to perform, responsive to a determination that the accuracy associated with the specific one of the one or more features is within the range of acceptable values, an action with respect to the specific one of the one or more features without communicating the data set to the second device.

* * * * *